US010298555B2

(12) United States Patent
Murray

(10) Patent No.: US 10,298,555 B2
(45) Date of Patent: May 21, 2019

(54) SECURING FILES UNDER THE SEMI-TRUSTED USER THREAT MODEL USING PER-FILE KEY ENCRYPTION

(71) Applicant: Zettaset, Inc., Mountain View, CA (US)

(72) Inventor: Eric A. Murray, Los Gatos, CA (US)

(73) Assignee: ZETTASET, INC., Mountain View, CA (US)

( * ) Notice: Subject to any disclaimer, the term of this patent is extended or adjusted under 35 U.S.C. 154(b) by 190 days.

(21) Appl. No.: 15/168,332

(22) Filed: May 31, 2016

(65) Prior Publication Data
US 2016/0277373 A1  Sep. 22, 2016

Related U.S. Application Data

(63) Continuation-in-part of application No. 14/245,295, filed on Apr. 4, 2014, now Pat. No. 9,363,247.

(51) Int. Cl.
*H04L 29/06* (2006.01)
*G06F 9/54* (2006.01)
(Continued)

(52) U.S. Cl.
CPC ............ *H04L 63/061* (2013.01); *G06F 9/54* (2013.01); *G06F 17/30* (2013.01); *G06F 21/602* (2013.01);
(Continued)

(58) Field of Classification Search
CPC ..... H04L 63/061; H04L 9/088; H04L 9/3242; H04L 9/0891; H04L 9/0822;
(Continued)

(56) References Cited

U.S. PATENT DOCUMENTS 6,618,789 B1   9/2003 Okaue et al.
6,792,539 B1   9/2004 Oishi et al.
(Continued)

FOREIGN PATENT DOCUMENTS

EP           2511848 A3    4/2014
WO      2013-093209 A1    6/2013

OTHER PUBLICATIONS

Bian, et al., The Jigsaw Secure Distributed File System, Division of Biomedical Informatics, Univ. of AK for Medical Sciences, 2009, pp. 1-24, IEEE Symposium on Computational Intelligence in Cyber Security, Journal Version, Nashville, TN, USA.
(Continued)

*Primary Examiner* — David Garcia Cervetti
(74) *Attorney, Agent, or Firm* — Asif Ghias

(57) ABSTRACT

A computer system and methods for securing files in a file system with storage resources accessible to an authenticable user using an untrusted client device in a semi-trusted client threat model. Each file is secured in the file system in one or more ciphertext blocks along with the file metadata. Each file is assigned a unique file key FK to encrypt the file. A wrapping key WK assigned to the file is used for encrypting the file key FK to produce a wrapped file key WFK. The file is encrypted block by block to produce corresponding ciphertext blocks and corresponding authentication tags. The authentication tags are stored in the file metadata, along with an ID of the wrapping key WK, wrapped file key WFK, last key rotation time, an Access Control List (ACL), etc. The integrity of ciphertext blocks is ensured by authentication tags and the integrity of the metadata is ensured by a message authentication code (MAC).

17 Claims, 11 Drawing Sheets

(51) Int. Cl.
| | |
|---|---|
| *G06F 17/30* | (2006.01) |
| *G06F 21/60* | (2013.01) |
| *G06F 21/62* | (2013.01) |
| *H04L 9/06* | (2006.01) |
| *H04L 9/08* | (2006.01) |
| *H04L 9/32* | (2006.01) |

(52) U.S. Cl.
CPC ........ *G06F 21/6218* (2013.01); *H04L 9/0637* (2013.01); *H04L 9/088* (2013.01); *H04L 9/0822* (2013.01); *H04L 9/0891* (2013.01); *H04L 9/3242* (2013.01); *H04L 63/0435* (2013.01); *H04L 63/0876* (2013.01); *H04L 63/101* (2013.01); *G06F 2221/2107* (2013.01); *H04L 63/08* (2013.01)

(58) Field of Classification Search
CPC ............... H04L 9/0637; H04L 63/0435; H04L 63/0876; H04L 63/101; H04L 63/08; G06F 17/30; G06F 21/602; G06F 21/6218; G06F 9/54; G06F 2221/2107
See application file for complete search history.

(56) References Cited

U.S. PATENT DOCUMENTS

| | | | | |
|---|---|---|---|---|
| 7,117,371 | B1* | 10/2006 | Parthasarathy | G06F 21/51 713/187 |
| 7,319,751 | B2 | 1/2008 | Kirichenko | |
| 7,392,384 | B2 | 6/2008 | Hopkins et al. | |
| 7,921,284 | B1 | 4/2011 | Kinghorn et al. | |
| 8,037,319 | B1 | 10/2011 | Clifford | |
| 8,117,464 | B1* | 2/2012 | Kogelnik | H04L 63/0428 380/284 |
| 8,121,294 | B2 | 2/2012 | Ciet et al. | |
| 8,397,084 | B2 | 3/2013 | Ranade | |
| 8,667,273 | B1 | 3/2014 | Billstrom et al. | |
| 8,782,441 | B1 | 7/2014 | Osterwalder et al. | |
| 8,832,466 | B1 | 9/2014 | McGregor et al. | |
| 9,268,964 | B1* | 2/2016 | Schepis | G06F 21/6227 |
| 9,619,487 | B2* | 4/2017 | Bane | G06F 17/30253 |
| 2002/0138726 | A1* | 9/2002 | Sames | H04L 63/14 713/166 |
| 2004/0091114 | A1* | 5/2004 | Carter | G06F 21/606 380/259 |
| 2005/0210072 | A1* | 9/2005 | Bojinov | G06F 17/30067 |
| 2006/0136721 | A1* | 6/2006 | Bruestle | H04L 12/44 713/168 |
| 2007/0011469 | A1* | 1/2007 | Allison | G06F 21/6209 713/193 |
| 2007/0016771 | A1* | 1/2007 | Allison | G06F 21/6209 713/165 |
| 2008/0263363 | A1* | 10/2008 | Jueneman | G06F 21/32 713/184 |
| 2009/0106549 | A1* | 4/2009 | Mohamed | G06F 21/6218 713/156 |
| 2009/0172265 | A1* | 7/2009 | Park | G06F 12/0246 711/103 |
| 2009/0265772 | A1* | 10/2009 | Hitchcock | G06F 21/335 726/7 |
| 2009/0287837 | A1* | 11/2009 | Felsher | G06F 19/328 709/229 |
| 2009/0304180 | A1 | 12/2009 | Kunigk et al. | |
| 2010/0070778 | A1* | 3/2010 | Murray | G06F 21/6218 713/189 |
| 2010/0095115 | A1 | 4/2010 | Murray | |
| 2010/0095127 | A1* | 4/2010 | Banerjee | H04L 63/0428 713/179 |
| 2010/0095132 | A1 | 4/2010 | Murray | |
| 2010/0098255 | A1 | 4/2010 | Ciet et al. | |
| 2010/0138905 | A1* | 6/2010 | Kass | G06F 21/33 726/7 |
| 2010/0150344 | A1 | 6/2010 | Karroumi et al. | |
| 2010/0169640 | A1* | 7/2010 | Smith | G06F 21/335 713/155 |
| 2010/0332825 | A1* | 12/2010 | Bradley, II | H04L 63/0823 713/158 |
| 2011/0022640 | A1* | 1/2011 | Franco | H04L 51/00 707/802 |
| 2011/0161370 | A1* | 6/2011 | Miyamae | G06F 17/30067 707/783 |
| 2011/0239001 | A1* | 9/2011 | McCormack | G06F 21/55 713/189 |
| 2011/0252232 | A1* | 10/2011 | De Atley | G06F 17/30117 713/165 |
| 2011/0252233 | A1* | 10/2011 | De Atley | G06F 11/1458 713/165 |
| 2011/0252234 | A1* | 10/2011 | De Atley | H04L 9/0891 713/165 |
| 2011/0252236 | A1* | 10/2011 | De Atley | G06F 11/1464 713/168 |
| 2011/0252243 | A1* | 10/2011 | Brouwer | H04L 9/0838 713/189 |
| 2012/0110323 | A1* | 5/2012 | Colclasure | G06F 17/30106 713/153 |
| 2012/0189119 | A1 | 7/2012 | Brickell et al. | |
| 2012/0254125 | A1* | 10/2012 | Bosson | G06F 11/1453 707/679 |
| 2012/0254136 | A1* | 10/2012 | Bosson | G06F 21/6227 707/699 |
| 2013/0136256 | A1 | 5/2013 | Relyea et al. | |
| 2013/0198522 | A1* | 8/2013 | Kohno | G06F 21/62 713/182 |
| 2013/0346716 | A1 | 12/2013 | Resch | |
| 2014/0020111 | A1* | 1/2014 | Wang | G06F 21/10 726/26 |
| 2014/0032924 | A1* | 1/2014 | Durham | G06F 21/10 713/186 |
| 2014/0040286 | A1* | 2/2014 | Bane | G06F 17/30253 707/754 |
| 2014/0075518 | A1 | 3/2014 | DSouza et al. | |
| 2014/0089683 | A1 | 3/2014 | Miller et al. | |
| 2014/0130119 | A1* | 5/2014 | Goldschlag | H04L 63/101 726/1 |
| 2014/0143541 | A1* | 5/2014 | Chang | G06F 12/1408 713/165 |
| 2014/0189348 | A1* | 7/2014 | El-Shimi | G06F 21/6218 713/165 |
| 2014/0258719 | A1* | 9/2014 | Cidon | G06F 21/62 713/165 |
| 2014/0304512 | A1* | 10/2014 | Kotov | H04L 9/14 713/171 |
| 2014/0365759 | A1* | 12/2014 | Wang | H04L 67/02 713/151 |
| 2015/0161410 | A1* | 6/2015 | Andersen | H04L 63/0457 713/165 |
| 2015/0207623 | A1* | 7/2015 | Pandian | H04L 9/0891 713/165 |
| 2015/0220398 | A1* | 8/2015 | Schirripa | G06F 11/1469 707/675 |
| 2015/0220429 | A1* | 8/2015 | Cypher | G06F 11/2094 711/170 |
| 2015/0222517 | A1* | 8/2015 | McLaughlin | H04W 4/70 713/156 |
| 2015/0244522 | A1* | 8/2015 | Cheruvath | H04L 9/0894 713/183 |
| 2015/0281189 | A1* | 10/2015 | Nayshtut | H04L 63/045 713/168 |
| 2016/0078243 | A1* | 3/2016 | Bruso | G06F 21/6218 726/27 |
| 2016/0078244 | A1* | 3/2016 | Bruso | G06F 21/6218 713/189 |
| 2016/0241389 | A1* | 8/2016 | Le Saint | H04L 9/0844 |

OTHER PUBLICATIONS

Borthakur, D, The Hadoop Distributed File System: Architecture and Design, http://hadoop.apache.org/docs/current/hadoop-project-

(56) References Cited

OTHER PUBLICATIONS dist/hadoop-hdfs/HdfsDesign.html, 2014, pp. 1-14, Apache Software Foundation.

Howard, et al., Scale and Performance in a Distributed File System, ACM Transactions on Computer Systems, vol. 6, No. 1, Feb. 1988, pp. 51-81, ACM New York, NY, USA.

Kher, et al., Securing Distributed Storage: Challenges, Techniques, and Systems, Proceedings of the 2005 ACM workshop on Storage security and survivability, 2005, pp. 9-25, ACM New York, NY, USA.

Pletka. et al.. Cryptographic Security for a High-Performance Distributed File System. Mass Storage Systems and Technologies, 2007., pp. 227-232, MSST 2007. 24th IEEE Conference, San Diego, CA, USA.

Sandberg, R, The Sun Network Filesystem: Design, Implementation and Experience, Sun Microsystems, Inc,, 1986 USENIX, California, USA.

Warner, et al., Tahoe: A Secure Distributed Filesystem, http://allmydata.org, Mar. 2008, https://tahoe-lafs.org/—warner/pycon-tahoe.html.

\* cited by examiner

SECURING FILES UNDER THE SEMI-TRUSTED USER THREAT MODEL USING PER-FILE KEY ENCRYPTION

RELATED APPLICATIONS

This application is a Continuation-in-part of now allowed U.S. application Ser. No. 14/245,295 filed on Apr. 4, 2014. The above numbered application is incorporated by reference herein in its entirety.

FIELD OF THE INVENTION

This invention relates to enabling computer systems that serve files to authenticable users that access the system from untrusted client devices for securing these files in an efficient manner under the corresponding semi-trusted user threat model. More precisely, the invention applies to highly available file systems that use symmetric keys and per-block key encryption to achieve file security.

BACKGROUND ART

The evolution of large networks and computing resources in the cloud are posing new challenges to file security in the era of the highly mobile user. Files that are served to such users from resources that are in the cloud can be accessed with various types of user devices. These devices may be mobile or stationary. The devices themselves can be the user's primary devices, but more often they devices that the user treats as secondary, tertiary or even sporadic.

Under these parameters, users that can access files stored in the cloud from many different devices present a particular problem, since their devices are less trustworthy than the users. Hence, securing files served up through computer clusters in conformance to this new threat model has become a pressing need. More precisely, the problem concerns securing high performance compute cluster's distributed file systems. The file system must allow access from many different client devices that are not trusted, but their users can be authenticated. The file system data must be available for processing on nodes inside the cluster (cluster computing).

Existing encrypted distributed file systems do not meet the requirements. They are not designed for "big data" cluster computing and do not offer the required performance. This refers in particular to Tahoe and JigDFS. As explained by Bian, J. and Seker R., "The Jigsaw Secure Distributed File System", Computers & Electrical Engineering, Feb. 1, 2013, the class of secure distributed file systems such as Tahoe and Cleversafe use an Information Dispersal Algorithm (IDA) to achieve fault tolerance as well as introduce a certain level of security. JigDFS falls into this category as well. Especially in Tahoe, like in JigDFS, files to be uploaded are encrypted, then split up into slices. Each slice is uploaded to a different server to spread the load uniformly, avoid correlated failures, and limit each node's knowledge about the original file. However, unlike Tahoe and Cleversafe JigDFS employs a decentralized peer-to-peer structure that enhances the system's scalability and improves the system availability in the event of a server failure. Moreover, in JigDFS, file segments are encrypted recursively using keys derived from the hashed-key chain algorithm and then sliced further through the IDA encoder. By doing so, JigDFS not only increases system's fault tolerance and data availability, but also makes attacks on file system and data more difficult. However, a JigDFS cluster is organized as a decentralized peer-to-peer network without a central server.

Systems that do offer commensurate performance levels, on the other hand, require that client devices be trusted and are hence not well-suited under the new threat model. Still others, such as NFS, AFS and HDFS do not protect data cryptographically.

Encryption usually imposes a heavy burden on a file system. To limit this burden, there is a need to avoid separate encryption work such as block-level encryption for data at rest and separate, e.g., storage network encryption for data in flight or in transit. This issue is identified by Pletka R., et al., "Cryptographic Security for a High-Performance Distributed File System", IBM Zurich Research Laboratory, Switzerland, 2006, pp. 1-13. The authors also point out that an optimally secure distributed storage architecture should minimize the use of cryptographic operations and avoid unnecessary decryption and re-encryption of data as long as the data does not leave the file system.

Of course, encryption of data by block and per-page keys is known in the art. For example, U.S. Pat. No. 8,121,294 to Ciet et al. discloses systems, methods and media that split input data into blocks and derive per page keys. These are obtained by using a master key in conjunction with still other keys.

In EP 2,511,848 Van der Veen teaches encryption of data that is appropriate for large scale file systems. Van der Veen deploys a per-data key or an "object" cryptographic key that is encrypted in a different key, thus providing for a level of indirection to the encrypted files in the process. The second key is a per "domain" key. These teachings are specifically concerned with file metadata that could be stored anywhere in the system.

Despite the many useful teachings outlined in the above references and many more contained in the literature, there exists an unmet need for proper safeguarding of files in file systems served in the cloud. Here, the prior art teachings do not provide for a method and system that can be deployed in a distributed file system (DFS) on a computer cluster that is accessed under the threat model of an untrusted device used by an authenticable user (semi-trusted user threat model).

OBJECTS AND ADVANTAGES OF THE INVENTION

In view of the shortcomings of the prior art, it is an object of the invention to provide for secure file systems and encryption methods while operating under the semi-trusted user threat model.

More precisely, it is an object of the invention to enable efficient and secure file systems, including distributed file systems in highly available computer clusters, to achieve a high level of security rapidly.

Further, it is an object of the invention to provide for securing data in a distributed file system in a way that cryptographically ensures the integrity of the data and metadata.

It is a further object of the invention to provide for centralized policy management, and automatic key generation.

It is a further object of the invention to achieve the above while keeping the data secure both at-rest and in-transit.

These and many other objects and advantages of the invention will become apparent from the ensuing description.

SUMMARY OF THE INVENTION

A number of objects and advantages of the invention are achieved by a computer system and methods designed for securing a plaintext file $F_p$ in a file system equipped with storage resources that are accessible to an authenticable user $U_x$ operating with an untrusted client device. The threat model underlying the invention is a situation that will be referred to herein as a semi-trusted client model.

Plaintext file $F_p$ that is to be secured contains one or more blocks $M_i$ of plaintext content/data. According to the invention, plaintext file $F_p$ is secured as a corresponding encrypted, ciphertext file $F_c$ containing ciphertext blocks $C_i$ corresponding to plaintext blocks $M_i$ of file $F_p$. Each ciphertext block $C_i$ corresponds to the respective plaintext block $M_i$ and vice-versa.

A symmetric per-file key FK is assigned to the plaintext file $F_p$, or equivalently to the corresponding ciphertext file $F_c$. Encryption and decryption are accomplished in a 'compatibility' or shim layer provided above an Application Programming Interface (API) layer of the underlying file system. Preferably, the underlying file system is a Hadoop Distributed File System (HDFS), and so the shim is provided between the untrusted client device and HDFS API's. All calls to the file system go through shim, and because of the shim's compatibility function, those calls do not need to be changed.

In accordance with the invention, each plaintext file $F_p$ or equivalently its ciphertext counterpart $F_c$ is assigned a symmetric file key FK and symmetric wrapping key WK which is used to wrap file key FK to produce a wrapped file key WFK. The symmetric file key FK is unique per file, while wrapping key WK may be configured to be shared between files of a directory or a directory tree. This configuration is contained in a security/configuration policy managed by a policy engine. All wrapping keys are eventually stored in a key manager securely communicating with the policy engine. The client (user $U_x$ on untrusted client device) and shim communicate with the policy engine also using a secure connection. The secure connections are authenticated and encrypted. Keys may be further secured in a hardware security module (HSM).

Alongside the encrypted contents (blocks $C_i$) of ciphertext file $F_c$, a file metadata is also stored. Preferably the metadata is stored in the extended attributes of HDFS. The metadata contains several attributes related to the file and is cryptographically protected using a message authentication code (MAC). In other words, a MAC value stored alongside the metadata allows subsequent verification of the integrity of the metadata or to confirm that the metadata has not been tampered with. Encryption and decryption are performed at the shim layer.

During encryption, which preferably employs Advanced Encryption Standard (AES) in Galois/Counter Mode (GCM) mode, each plaintext block $M_i$ is encrypted with file key FK to produce a corresponding ciphertext block $C_i$ and an authentication tag $T_i$. The authentication tags $T_i$ belonging to ciphertext file $F_c$ are also stored in its metadata. The metadata of the file is related to the ciphertext file $F_c$ or equivalently also its plaintext counterpart $F_p$. As such, the metadata may be said to belong to files $F_p/F_c$. During decryption of a ciphertext block $C_i$, its corresponding tag $T_i$ is first read from the metadata and is used to verify the integrity of block $C_i$. If the integrity check succeeds, block $C_i$ is decrypted with file key FK to produce the original plaintext block $M_i$.

A file system request related to a file, and initiated from the untrusted client device is intercepted and serviced by the shim layer. As a first step, authentication of the user $U_x$ is performed by the policy engine. Authentication is preferably based on a Kerberos token passed from the client device to the shim and subsequently to the policy engine. If authentication is successful, policy engine reads the metadata of the file, after first verifying the integrity of the contents of the metadata, based on the stored MAC of the metadata. Preferably, each attribute of the metadata is secured by its own MAC, so that when an attribute is to be read, its specific MAC can be used to check the integrity of the attribute.

One of the metadata attributes is an Access Control List (ACL) related to the file. Policy engine reads ACL to further authorize the file system request of user $U_x$. If user $U_x$ has the required privileges based on the ACL to perform the desired file operation, then the authorization is successful, otherwise not. Once the user has been authenticated and authorized, policy engine reads from the file metadata a key ID related to wrapping key WK of the file i.e. WK ID, as well as a wrapped file key WFK. It then queries the key manager with WK ID, requesting it to return the corresponding wrapping key WK.

Once policy engine has wrapping key WK, it unwraps wrapped file key WFK with WK to obtain file key FK related to the file in the file system request. It then sends/releases file key FK to shim layer. The shim layer can then perform an encrypt/decrypt operation per above explanation as needed. If a new file is being created, the policy engine generates a new file key FK. It may also generate a new wrapping key depending on the configuration information in its policy as to whether the wrapping key may or may not be shared between files, directories or directory trees. Such automatic key generation is beneficial for a smooth, secure and reliable operation of the system.

In any scenario, wrapping key WK is never revealed to the client. This isolation means that the compromise of a single file key FK does not jeopardize more than one files in the file system and that one wrapping key WK may be safely shared for several files/directories. Key manager may or may not be a separate module. The advantage of having it as a separate module is that commercial off the shelf (COTS) products may be easily integrated into the system, such as those based on Key Management Interoperability Protocol (KMIP). Otherwise, key manager may be integrated into the policy engine or vice versa. Many such design choices will be apparent to skilled artisans.

Further, it is preferable that the connection between the untrusted client device/shim and the key manager as well as the policy engine, irrespective of whether the latter two are a single module or not, be a secure and mutually authenticated connection. That is because, policy engine would need to communicate file key FK to the shim securely, and the key manager would need to communicate wrapping key WK to policy engine securely. In the absence of a secure connection, these keys may be sent via a key exchange key protocol.

Although the invention can be practiced in many contexts, it is preferably implemented in a file system that is a distributed file system (DFS). Exemplary distributed file systems are Mogile FS and Hadoop Distributed File System (HDSF). The storage resources will typically be distributed storage resources. Modern computer clusters satisfy these criteria and hence represent suitable contexts for practicing the invention. When deploying in such clusters, high availability computer clusters are preferable.

In the embodiments that employ Hadoop as the underlying architecture, there is preferably a master policy engine that runs in the name node of the Hadoop cluster, and there are individual policy engines running on a subset or all of the data nodes or datanodes. Any updates to the policy are communicated by the master policy engine to the policy engines on the data nodes by public/private key pair or digital signatures belonging to the master. The master can push new policies to the policy servers, and they can also pull policy updates from the master. This ensures that the policy cannot be modified by an attacker and that all the policy engines have the same policy. This centralized policy management is very beneficial in an efficient, secure and reliable operation of the distributed system.

In practical implementations the user $U_x$ will typically be a member of a group of such authenticable users working on untrusted client devices which could be mobile devices. The present "layered approach" to security under the semi-trusted client model is well suited to modern mobile environments. In fact, the computers system of the invention is well-adapted to applications where the untrusted client device is a mobile user device that may or may not be the user's permanent device. In general, the untrusted client device can thus be a mobile phone, a mobile computer, a tablet computer and any one of a large and growing number of thin client devices that include sensor-based computing units on the Internet of things.

The present invention, including the preferred embodiment, will now be described in detail in the below detailed description with reference to the attached drawing figures.

BRIEF DESCRIPTION OF THE DRAWING FIGURES

FIG. 1 is a high-level diagram illustrating the main aspects of a computer system deploying methods associated with the semi-trusted client threat model according to the invention.

FIG. 2A-B are diagrams illustrating the basics of an encoding process according to the invention.

DETAILED DESCRIPTION

The following description relates to preferred embodiments of the present invention by way of illustration only. Likewise, the figures depict embodiments of the present invention for purposes of illustration only. One skilled in the art will readily recognize from the description and figures that alternative embodiments of the methods and systems depicted herein may be employed without departing from the principles of the invention described herein.

Figure 1:
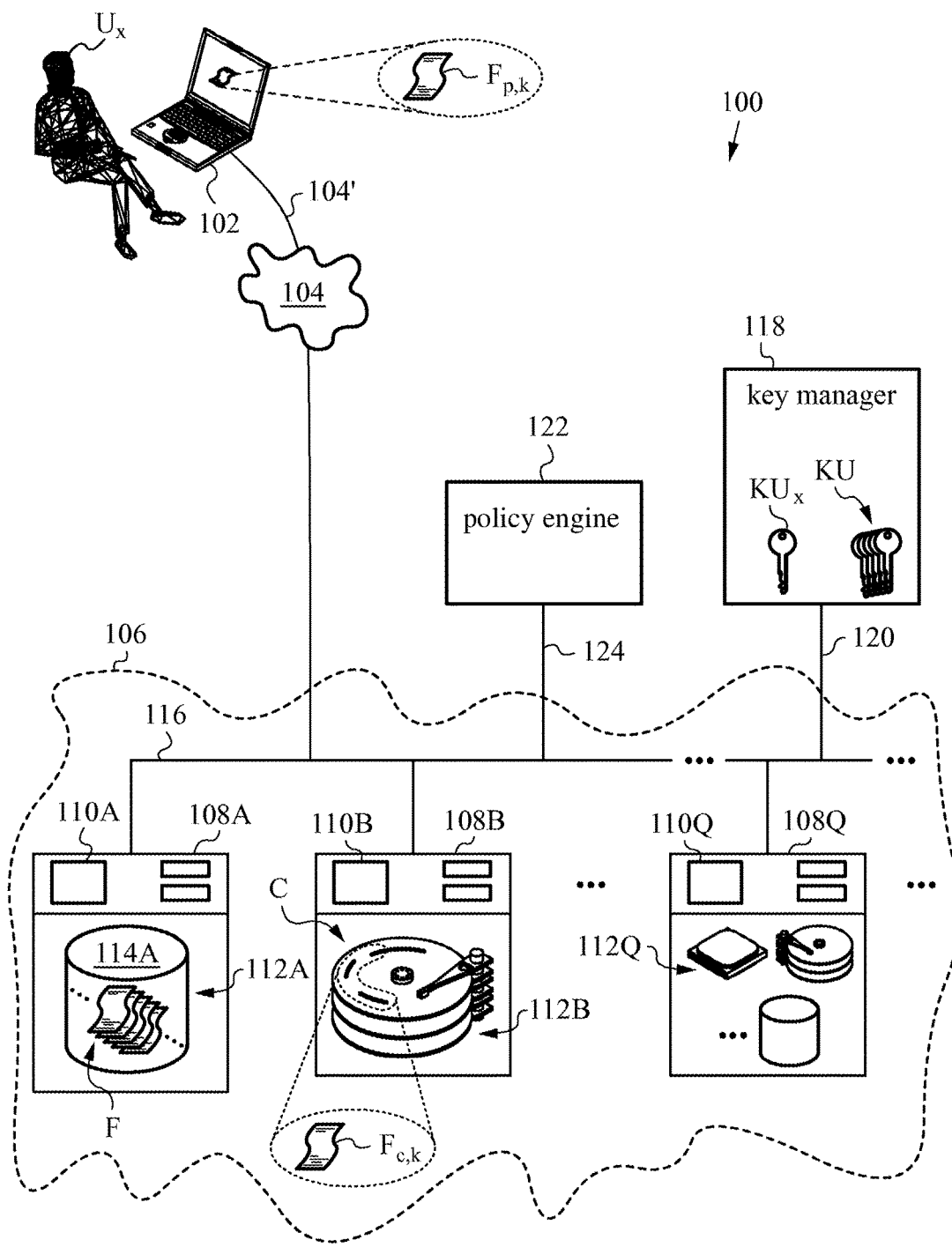

The present invention will be best understood by initially referring to the high-level diagram of FIG. 1. This drawing shows the main aspects of a computer system 100 deploying methods associated with the semi-trusted client threat model according to the invention. The semi-trusted client threat model underlying the invention is presently a rather uncommon situation. That is because most prior art computer systems, e.g., cloud based platforms and various types of computer clusters, prefer to work with both client equipment and users that are authenticable.

Under the semi-trusted client threat model an authenticable user U, in this case designated as a specific authenticable user $U_x$, is working with an untrusted client device 102. In the present embodiment, client device 102 is a mobile computer, and more specifically still a laptop computer. In general, however, client device 102 can be any type of device capable of making a network connection and performing any useful function. In most cases, of course, client device 102 is a mobile user device such as a mobile phone, a mobile computer, a tablet computer or any thin client device, including devices ranging from electronic watches to sensors with minimal processing capabilities. The latter are sometimes referred to as networked devices making up the Internet of things by those skilled in the art.

Authenticable user $U_x$ uses his laptop computer 102 to connect to computer system 100 over a network connection 104 by any suitable medium 104'. Connection 104 can thus deploy any type of wireless or wired medium 104'. In fact, communication network 104 can include a Wide Area Network (WAN) like the Internet, a Metropolitan Area Network (MAN) or a Local Area Network (LAN). The physical connection can be supported by any communications infrastructure including wired, optical and wireless.

In the preferred embodiment, computer system 100 is implemented in a computer cluster 106 encompassed by a dashed line. Cluster 106 can be geographically collocated or spread out over several physical locations. For reasons of clarity, only the few parts of cluster 106 required to explain the invention are shown explicitly. It will be evident to a skilled artisan, however, that computer cluster 106 can also be implemented on various computer grids and other configurations well known in the art.

Cluster 106 has a number of machines or computers typically referred to as nodes by those skilled in the art. Of all such nodes, which may number in the hundreds or even thousands, only three, namely nodes 108A, 108B, 108Q are expressly shown. In this example, nodes 108A, 108B, 108Q are all provisioned with computing or processing resources 110A, 110B, 110Q. These may include central processing units (CPUs), graphical processing units (GPUs) and any generally acceptable dedicated or generic processor.

Nodes 108A, 108B, 108Q are provisioned with different types of storage resources 112A, 112B and 112Q. Resources 112A are embodied by any local storage hardware capable of storing files generally designated by reference F in any suitable format including preferably a file system 114A. Resources 112B are embodied by a local hard disk array that can also store files F, in either the same or a different file system. Preferably, in fact, file system 114A is a distributed file system that is stored and managed across cluster 106, thus including node 108B and its storage resources 112B.

The embodiment in FIG. 1 is one in which file system 114A is indeed distributed over the nodes of cluster 106. A specific plaintext file $F_{p,k}$ from distributed file system 114A is shown in unencrypted form being worked on by user $U_x$ on laptop computer 102. Also shown is the corresponding encrypted or ciphertext file $F_{c,k}$. Ciphertext file $F_{c,k}$ is stored or distributed over blocks M designated within an area indicated by a dashed outline on disk array 112B. The details of plaintext file $F_{p,k}$ handling and its encryption to ciphertext file $F_{c,k}$ will be described further below.

Meanwhile, resources 112Q are heterogeneous and thus include all types of suitable hardware including flash storage drives, disk drives including redundant arrays such as RAID and optical storage resources. There is no limitation on the types of storage devices, other then they should be partitionable into blocks. Thus, resources 112Q are also capable of storing files F distributed over any number of storage blocks belonging to their block-storage devices. Further, resources 112Q are also capable of storing files F belonging to distributed file system 114A.

The nodes of cluster 106, including nodes 108A, 108B, 108Q are interconnected by a corresponding network of interconnections 116. In many situations, interconnections 116 are embodied by a local area network LAN and include any special connections, such as heartbeat lines, etc. Furthermore, when cluster 106 is geographically spread out, interconnections 116 include the requisite intra- and inter-cluster communication fabric including any suitable wide area network lines (WAN) or dedicated pipes.

In accordance with a preferred embodiment of the invention under the semi-trusted client threat model, computer system 100 deploys a key manager 118 for generating and handling user keys KU. Key manager 118 can be a separate unit, a module outside cluster 106 or it can be included in or as part of cluster 106. In the embodiment shown, key manager 118 resides outside cluster 106 and is connected to it via connection 120.

Computer system 100 is also equipped with a policy engine 122. Engine 122 is dedicated to the task of authenticating authenticable users U. More precisely, engine 122 is to perform an authentication step preceding the release of user keys KU from key manager 118. For that reason, in some embodiments engine 122 and key manager 118 can be merged into a single module as a unified service rather than separate services. In fact, such joint key manager and policy engine could even be included in cluster 106. A joint key manager could even be implemented on one of the cluster's nodes, potentially including the master node (not explicitly shown) in charge of administration of cluster 106. On the other hand, in situations where such a merger could compromise security, engine 122 and key manager 118 are kept separate.

In the present embodiment, engine 122 is a stand-alone unit outside of cluster 106 and separate from key manager 118. In order to interface with cluster 106 and with key manager 118, engine 122 is provided with a suitable communication connection 124 to cluster 106, as shown. Clearly, connection 124, just like connection 120, can be made via any suitable wireless or wired communication medium.

Figure 2A:
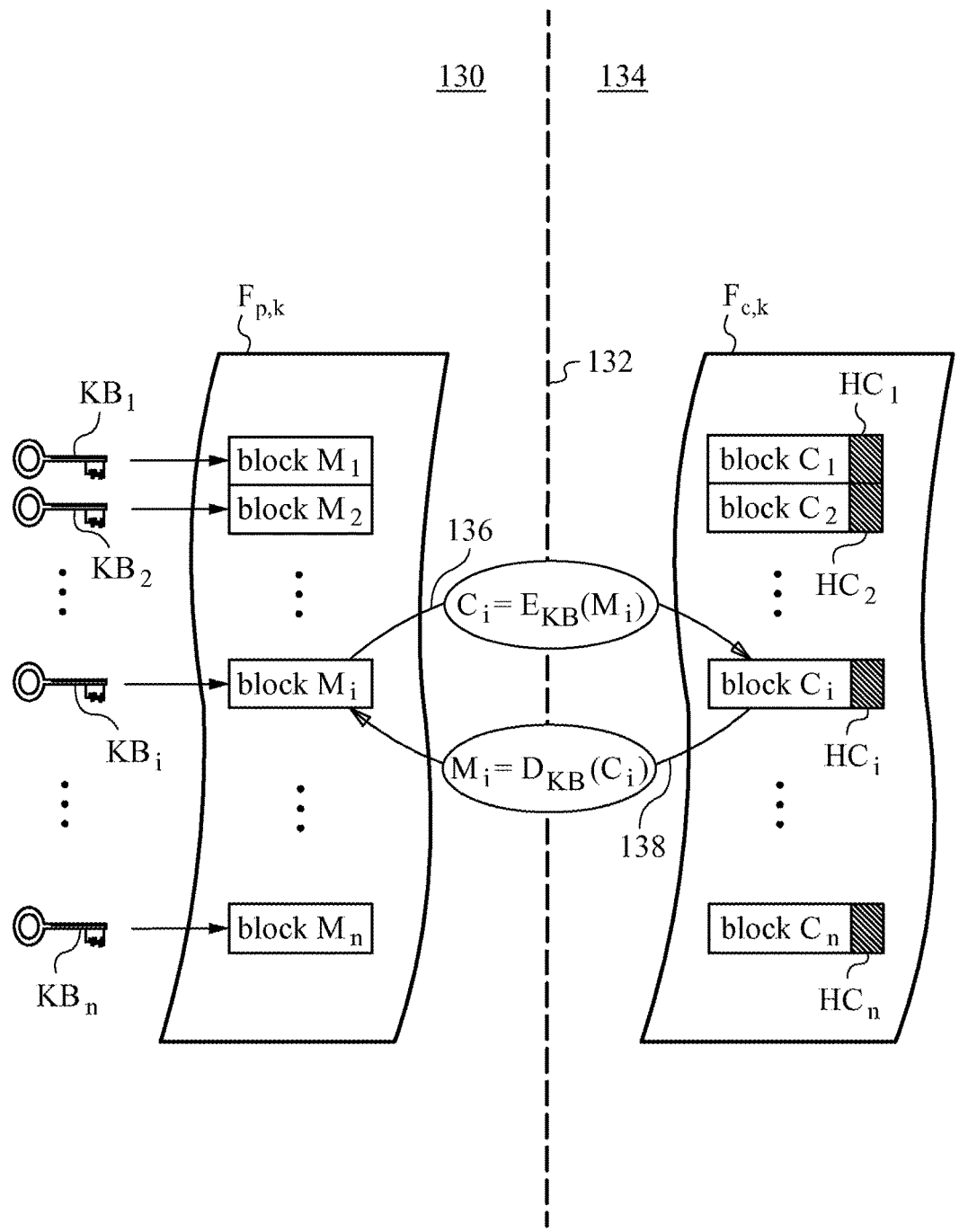
Figure 2B:
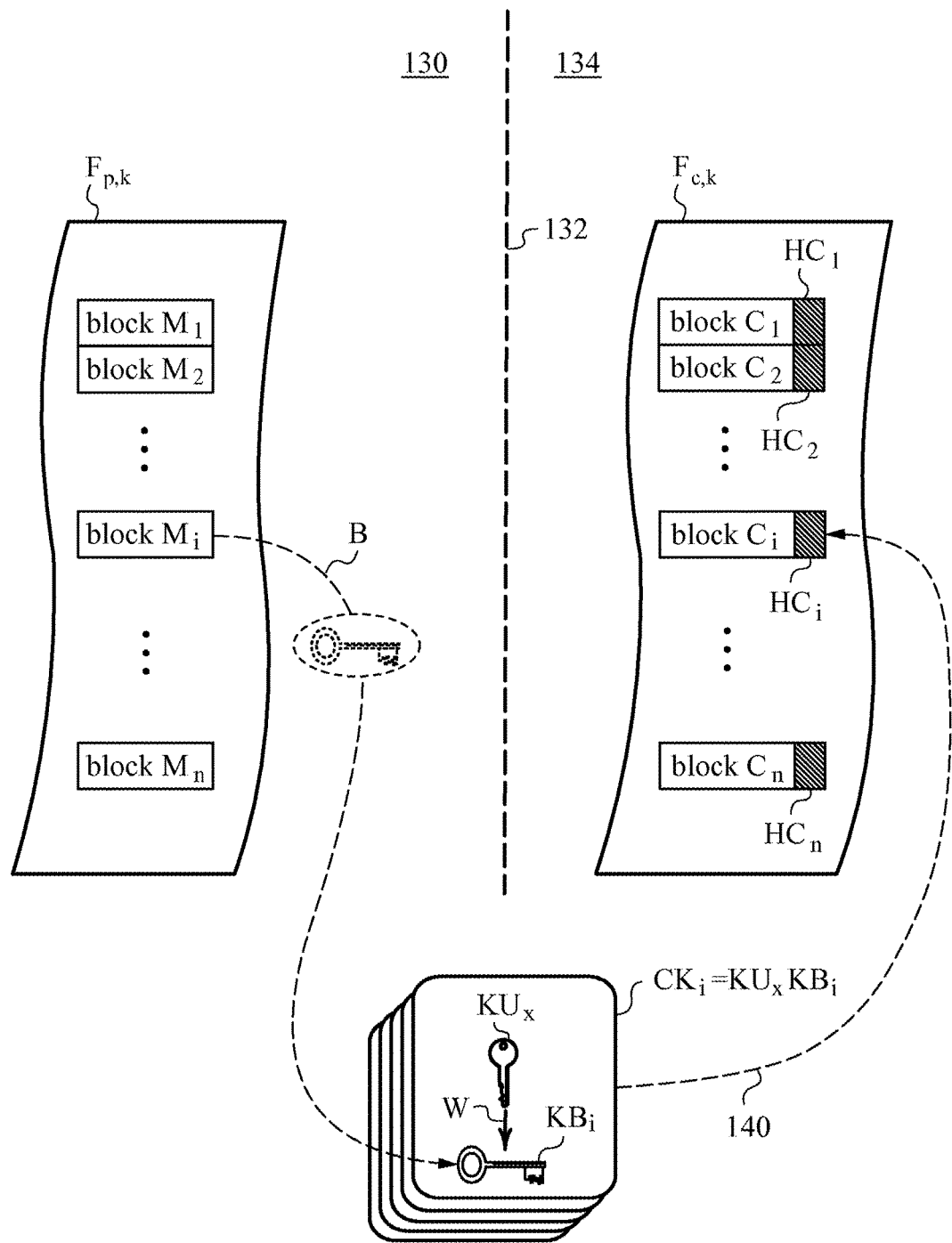

The operation of computer system 100 will now be described in reference to the high-level diagram of FIG. 1 and more detailed diagrams presented in FIGS. 2A-B showing the basics of the encoding process. Turning our attention first to key manager 118 in FIG. 1, we note that manager 118 deploys symmetric user keys KU. Symmetric encryption has the advantage that it is more efficient at processing large amounts of file encryptions and is computationally less intensive than encryption with asymmetric keys.

In the preferred embodiment of the invention, per-block keys KB as well as user keys KU are symmetric. The method of securing a plaintext file F in file system 114A will be best understood by initially referring to the handling of just one very specific plaintext file $F_{p,k}$. This handling is appropriate for unencrypted distributed file system.

As remarked above, file $F_{p,k}$ belongs to distributed file system 114A. Its encrypted form $F_{c,k}$ is distributed over blocks C within the designated area of the hard disk belonging to hard disk array 112B. The first portion of the file subscript, "p" or "k", refers to whether the file is plaintext or ciphertext. The second portion of the file subscript, "k", refers to the actual file. In the present case "k" indicates the k-th file from among files F present in file system 114A.

Turning our attention to FIG. 2A, we see k-th plaintext file $F_{p,k}$ with explicit designation of blocks M of which it consists while being worked on in the memory of laptop computer 102. In particular, file $F_{p,k}$ is distributed in n blocks designated here as blocks $M_1$, $M_2$, ..., $M_n$. Notice that plaintext file $F_{p,k}$ as shown on the left in the drawing has not yet been secured. Possibly, file $F_{p,k}$ is a document in any typical format (e.g., Work, Excel, etc.) and it is being processed by user $U_x$ on laptop 102. Thus, plaintext file $F_{p,k}$ resides in an unencrypted space 130, sometimes also referred to by those skilled in the art as the plain text subspace.

For better visualization and for purposes of explanation, unencrypted space 130 that holds plaintext files is shown left of a dashed line 132. Meanwhile, an encrypted space 134 where encrypted files are found is located to the right of dashed line 132.

As shown in FIG. 2A, symmetric per-block keys KB are generated so as to provide one for each of the n blocks $M_1$, $M_2$, ..., $M_n$ of which plaintext file $F_{p,k}$ is comprised. In particular, per-block key $KB_1$ is generated for block IC, per-block key $KB_2$ is generated for block $M_2$, and so on, with n-th per-block key $KB_n$ being generated for the last or n-th block $M_n$ of file $F_{p,k}$. Of course, remaining plaintext files $F_p$ in file system 114A are treated in a similar fashion. Thus symmetric per-block keys KB are generated for all plaintext files $F_{p,k}$ that are to be encrypted.

Each one of blocks $M_1$, $M_2$, ..., $M_n$ is encrypted using its per-block key $KB_1$, $KB_2$, ..., $KB_n$. In the case of first block $M_1$ its per-block key $KB_1$ is applied to the contents of block $M_1$ to perform the encryption. The same is done with the remaining blocks M using their respective per-block keys KB.

The encryption step is expressly visualized in FIG. 2A for the intermediate i-th block $M_i$. The application of encryption to block $M_i$ with the per-block key $KB_i$ is indicated by $E_{KB}$ (since this action applies to encryption in general, the subscript i has been left out). The action produces a resultant cipher block $C_i$. This operation can be conveniently summarized as:

$$C_i = E_{KB}(M_i), \qquad (\text{Eq. 1})$$

where the fact that $E_{KB}$ is operating on i-th block $M_i$ is indicated by the parentheses around block $M_i$. Decryption is indicated by $D_{KB}$. It is performed by just inverting the order of operation as follows:

$$M_i = D_{KB}(C_i), \qquad (\text{Eq. 2})$$

since per-block keys KB are symmetric. FIG. 2A also uses an arrow 136 to help visualize how the operation of Eq. 1 takes unencrypted block $M_i$ from plaintext space 130 to encrypted block $C_i$ in ciphertext space 134. Similarly, arrow 138 shows the action of Eq. 2, which returns unencrypted block $M_i$ from encrypted block $C_i$. In other words, Eq. 2 takes us from encrypted or ciphertext space 134 back to unencrypted or plaintext space 130.

The encryption $E_{KB}$ in accordance with Eq. 1 is applied to all blocks $M_1, M_2, \ldots, M_n$. This results in the encryption of entire k-th plaintext file $F_{p,k}$ to produce the corresponding k-th encrypted or ciphertext file $F_{c,k}$. Again, remaining plaintext files $F_p$ in file system 114A are treated in a similar fashion to obtain their correspondent ciphertext files $F_c$.

As a visualization aid, FIG. 1 indicates the physical location of ciphertext file $F_{c,k}$ once encrypted and stored in storage resources 112B of cluster 106. Specifically, ciphertext file $F_{c,k}$ is distributed over blocks $C_1, C_2, \ldots, C_n$ in a hard disk of disk array 112B. In other words, the files in file system 114A are actually stored encrypted.

It should be noted that the encryption and decryption steps take place on the client device 102. These steps are precipitated by the actions of user $U_x$ (see FIG. 1). They take place before the file is placed in file system 114A.

In accordance with the invention, securing of a plaintext file $F_p$, as demonstrated on the example of k-th plaintext file $F_{p,k}$ converted to k-th ciphertext file $F_{c,k}$, involves the additional step of encrypting each per-block key $KB_1$, $KB_2, \ldots, KB_n$. In other words, each one of per-block keys $KB_1, KB_2, \ldots, KB_n$, which was used in the encryption of corresponding blocks $M_1, M_2, \ldots, M_n$ to thus obtain encrypted blocks $C_1, C_2, \ldots, C_n$ and convert plaintext file $F_{p,k}$ to ciphertext file $F_{c,k}$, is itself separately encrypted. The encryption of per-block keys KB that were used to generate encrypted blocks C is performed with the user key KU. In other words, the encryption of per-block keys KB provided for by the present invention is user-specific.

In general, there may be more than one user key KU for any given block M of any file F. Therefore, any block key KB may be encrypted with different user key KU. This will generate several wrapped block keys KB, each wrapped key encrypted with a different user key KU. This type of approach allows access to the same block M by different users U or groups of users that use different user keys.

FIG. 2B illustrates the important step of encrypting a block key KB in a typical case. In this example, we focus on the already encrypted i-th block $C_i$ obtained from unencrypted i-th block $M_i$ through encryption with i-th per-block key $KB_i$.

Specific user $U_x$ of our example was assigned by key manager 118 user key $KU_x$ (see FIG. 1). User key $KU_x$ is now deployed to encrypt each per-block key KB. The encryption includes specifically i-th per-block key $KB_i$ generated for block $M_i$ as indicated by dashed arrow B.

In FIG. 2B the key encrypting operation of user key $KU_x$ acting on per-block key $KB_i$ is indicated by a short arrow W. The encrypting function denoted by arrow W will be referred to as wrapping. A person skilled in the art will recognize that encrypting a key with another key is commonly referred to as wrapping and is standard in the art of cryptography.

The application of the key-wrapping step yields one wrapped key $CK_i$ for each of the encrypted blocks $C_i$. Wrapped keys CK thus obtained, are placed in headers HC of corresponding encrypted blocks C. Therefore, wrapped key $CK_i$ is placed in header $HC_i$ of encrypted block $C_i$, as indicated by arrow 140. Advantageously, the introduction of wrapped keys CK introduces a new level of indirection to ciphertext file $F_{c,k}$ that is appropriate for the semi-trusted client threat model.

Computer system 100 implements the above-described method to secure all files $F_p$ in distributed file system 114A on storage resources 112A, 112B, 112Q and any other resources not shown in FIG. 1 that support file system 114A. An authenticable user U of file system 114A can now gain access to ciphertext files $F_c$ in file system 114A encrypted in accordance with the method of invention provided the per-block keys KB of ciphertext files $F_c$ are encrypted in his or her user key KU. Prior to obtaining his or her user key KU, however, user U has to be authenticated. In accordance with the present invention, user authentication is not dependent on the particular client device 102 that user U has chosen to connect to cluster 106 via network connection 104.

Figure 3:
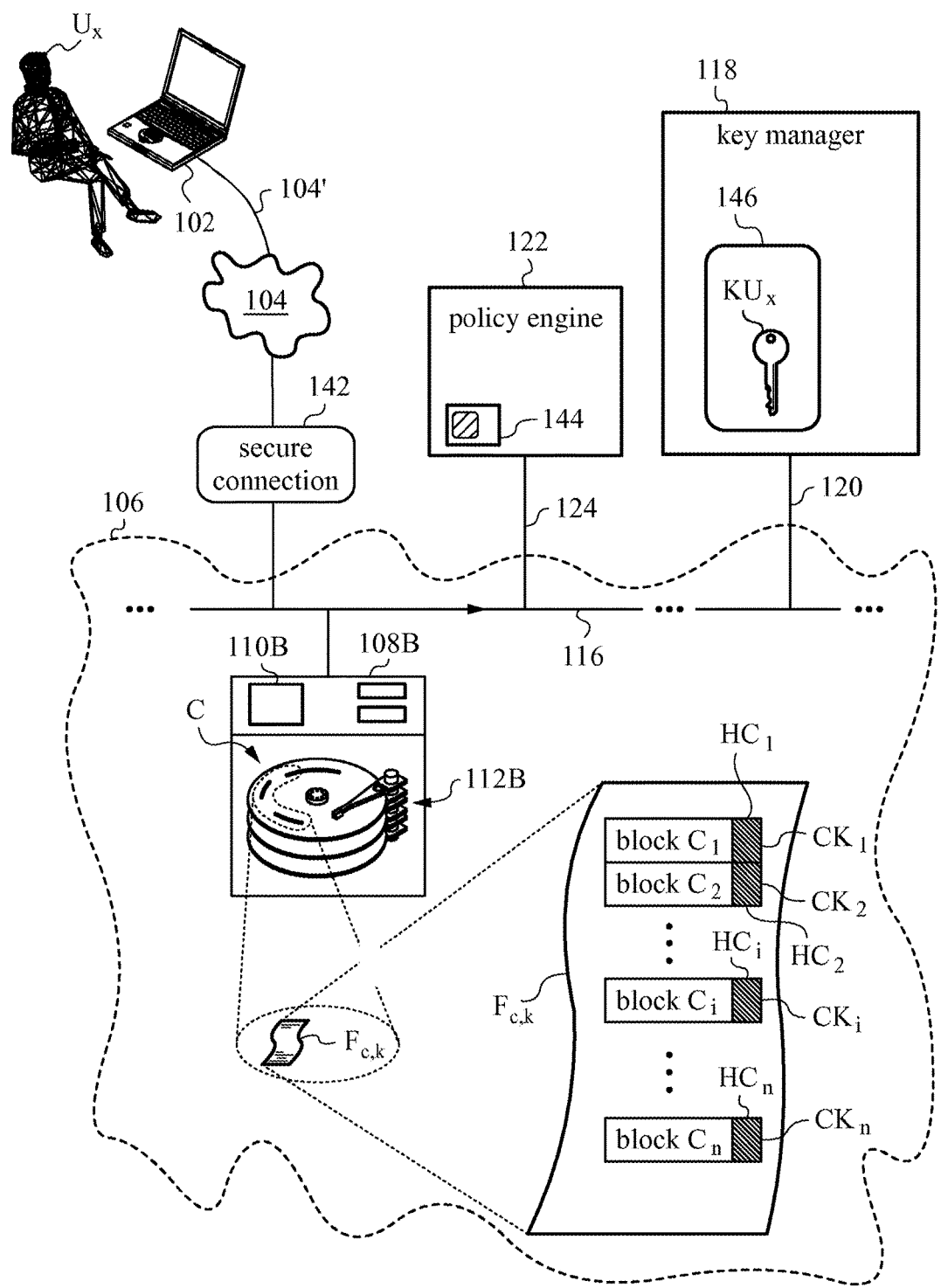
FIG. 3 is a diagram illustrating how a user accesses a file secured according to the invention.

FIG. 3 is a diagram that shows how specific user $U_x$ accesses a desired ciphertext file $F_c$ in file system 114A. For ease of explanation, we examine the case in which the requested ciphertext file $F_c$ is actually the k-th ciphertext file $F_{c,k}$ secured with the aid of wrapped keys CK placed in headers HC. Ciphertext file $F_{c,k}$ is stored in physical blocks here designated as blocks C to remind us that they hold encrypted data. As already indicated in FIG. 1, blocks C reside in the shown region of the hard disk of hard disk array 112B designated by the dashed outline. Two levels of an exploded view show ciphertext file $F_{c,k}$ and then its structure. Ciphertext file $F_{c,k}$ is distributed over ciphertext blocks $C_1, C_2, \ldots, C_n$ with corresponding headers $CH_1$, $CH_2, \ldots, CH_n$. As already explained above, headers $CH_1$, $CH_2, \ldots, CH_n$ contain wrapped keys $CK_1, CK_2, \ldots, CK_n$ required to retrieve plaintext file $F_{p,k}$.

Before proceeding, it should be noted that in many practical situations actual ciphertext blocks $CK_1$, $CK_2, \ldots, CK_n$ will not be sequential or have any prescribed standoff. They may not even be located on the same storage resources. What is required is that ciphertext files $F_c$ and their ciphertext blocks C secured according to the method of the invention be indexed in file system 114A so as to be accessible upon request from users U.

We now return to our specific user $U_x$ operating with untrusted client device embodied by laptop computer 102. User $U_x$ makes a connection with cluster 106 in which a part of computer system 100 is implemented. The contact is made via network connection 104 over medium 104'. In a preferred embodiment, network connection 104 is not a simple connection. Instead, it is a secure and mutually authenticated connection 142. In other words, both laptop computer 102 and policy engine 122 establish mutually authenticated connection 142.

The mutually authenticated connection 142 is desirable for communications between client device 102 and key manager 118. Similarly, the security afforded by mutually authenticated connection 142 is desirable for communications between client device 118 and policy engine 122 itself. In fact, communication with any nodes of cluster 106 may also be within the context of mutually authenticated connection 142. Note, however, that the only secure connections needed are between user's device 102 and key manager 118, and between key manager 118 and policy engine 122. This is true even under circumstances where engine 122 and key manager 118 are integrated into a single module, although in this case connection 142 need in principle only extend to that single module.

The step of authenticating authenticable user $U_x$ is important. Doing so ensures, that despite the fact that client device 102 is untrusted, user $U_x$ is at least authenticated. Any suitable mutual authentication procedure known to those skilled in the art can be recruited for the purpose of establishing mutually authenticated connection 142. For example, connection 142 can be a secure connection such as a Transport Layer Security (TLS) connection with the client authenticated by password, certificate or Kerberos token. Irrespective of the actual processes and services invoked in establishing connection 142, however, it is important that it be protected from modification/tampering/adulteration.

In the present embodiment, it is the policy engine 122 that actually records user's $U_x$ permissions within file system 114A. In other words, engine 122 keeps track of which plaintext files $F_p$ were secured according to the invention in authorized sessions of user $U_x$ and computer system 100. Therefore, engine 122 has a record of which encrypted files $F_c$ can be legitimately requested by user $U_x$.

In the present embodiment the connection between key manager 118 and engine 122 is also a secure connection. In other words, the path connecting them via connections 120, 124, and interconnections 116 (e.g., the LAN of cluster 106) is secure. When key manager 118 gets a request from user $U_x$ it queries engine 122 for authentication and access information. If engine 122 approves user $U_x$, then key manager 118 releases the corresponding user key $KU_x$.

Since key manger 118 that releases user key $KU_x$ to user $U_x$ is separate from engine 122 in the present embodiment a token-based approach is advantageous to ensure approved key release. Such approach is mostly easily implemented by introducing a token 144 that user $U_x$ can obtain from engine 122 upon authentication.

Key manager 118 can just send user key $KU_x$ directly to user $U_x$ if connection 142 is also encrypted. If connection 142 is not encrypted, then additional safety measures such as key wraps in key exchange keys should be deployed, as discussed in more detail below.

Upon verification of token 144, user key $KU_x$ is released to user $U_x$ from key manager 118. The step of releasing user key $KU_x$ is performed after receiving a request from user $U_x$ for ciphertext file $F_c$.

As mentioned above, if secure mutually authenticated connection 142 is not used, it is desirable that user key $KU_x$, when sent to user $U_x$ upon their specific request for ciphertext file $F_{c,k}$, be transmitted wrapped in a key exchange key 146. Key exchange key 146 can be any suitable exchange protocol. Such strategies are based on previously negotiated parameters between device 102 and key manager 118. Suitable processes are well known to those skilled in the art.

Once in possession of their user key $KU_x$, user $U_x$ can decode the desired ciphertext file $F_{c,k}$ stored in file system 114A. Recall that upon encryption with per-block keys $KB_1$, $KB_2$, ..., $KB_n$ ciphertext file $F_{c,k}$ was further secured by encrypting per-block keys $KB_1$, $KB_2$, ..., $KB_n$ with user key $KU_x$. The resulting wrapped keys $CK_1$, $CK_2$, ..., $CK_n$ were then placed in headers $HC_1$, $HC_2$, ..., $HC_n$. Since user $U_x$ is now in possession of user key $KU_x$ that was used to generate wrapped keys $CK_1$, $CK_2$, ..., $CK_n$, he can decrypt per-block keys $KB_1$, $KB_2$, ..., $KB_n$ from wrapped keys $CK_1$, $CK_2$, ..., $CK_n$ with user key $KU_x$. With the decrypted per-block keys $KB_1$, $KB_2$, ..., $KB_n$, user $U_x$ can now verify the integrity of cipher blocks $C_1$, $C_2$, ..., $C_n$ and decrypt ciphertext file $F_{c,k}$ by applying the operation of Eq. 2 (also see arrow 138 in FIG. 2A). This last step recovers original plaintext file $F_{p,k}$ that user $U_x$ wanted to access.

There are thus four steps for accessing any ciphertext file $F_c$ in distributed file system 114A. During the first step, user $U_x$ retrieves blocks C that contain the file of interest from file system 114A onto user's device 102. Then user $U_x$ is authenticated and obtains their user key(s) KU. Upon receipt, user $U_x$ deploys their user key(s) KU to decrypt wrapped key(s) CK, thus obtaining per-block key(s) KB. Finally, user $U_x$ decrypts blocks C of ciphertext file $F_c$ by deploying per-block keys KB to obtain decrypted, plaintext file $F_p$.

Computer system 100 and the method of the invention offer an efficient way to secure distributed file system 114A of cluster 106. In fact, system 100 and the method are compatible with cluster 106 whether the latter is embodied by a regular cluster or a high performance and high availability cluster. In other words, the system and method are compatible with high-performance implementations where file system 112A is available for processing on multiple nodes 108 within cluster 106 (cluster computing) and simultaneously available to many users U accessing cluster 106 via many untrusted client devices 102.

The two main reasons for this compatibility are the use of symmetric keys and the encoding of per-block keys KB with user keys KU. Since all keys are symmetric, they are inherently fast and efficient in securing files. Additionally, since per-block keys KB can be encoded with user keys KU of different users independently, the user load does not tend to affect the present system and method. Differently put, using the additional level of indirection in accordance with the invention, means that expanding the key pool with additional user keys KU only requires that per-block keys be encrypted in the added user keys rather than forcing encryption of an entire block in the added user key KU. As a result, the present system and method can be used to encrypt data files in a way that cryptographically enforces data access permissions yet does not greatly impact performance or usability. These characteristics allow for fast data analysis on nodes 108 of cluster 106.

Although the invention can be practiced in many contexts, it is preferably implemented in a file system that is a distributed file system (DFS) with distributed storage resources. The embodiment described in reference to FIGS. 1-3 was deployed in such distributed file system 114A. More specifically, file system 114A can be the Hadoop Distributed File System (HDSF), Mogile File System (Mogile FS), or another suitable distributed file system.

Some encrypted and distributed file systems cannot be easily deployed, as they do not meet certain requirements and are not designed for handling "big data" cluster computing. Even in the case of suitable systems, such as HDFS some modifications are necessary. For example, in the case of HDFS the requirement of confidentiality is not met and hence encryption has to be employed, as already mentioned above. With sufficient modifications however, as will be appreciated by those skilled in the art, almost any distributed file system and even non-distributed file systems can deploy the system and method of the invention. Many additional advantages of the system and method of the invention will now be elucidated in conjunction with the next embodiment.

Figure 4:
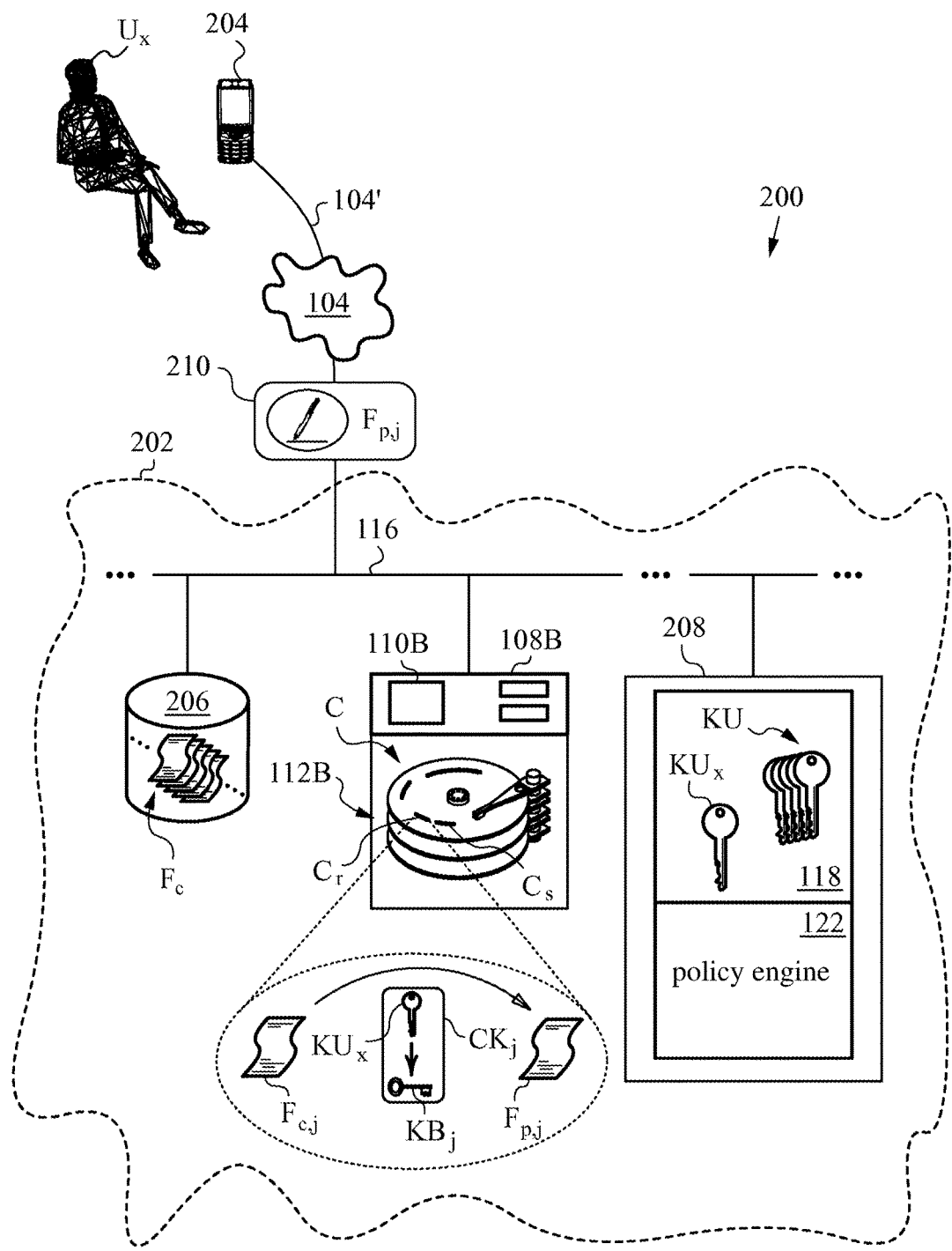
FIG. 4 is a diagram illustrating another embodiment of a computer system and the method while executing a write request.

FIG. 4 illustrates an embodiment of a computer system 200 that is more completely integrated with a high availability and high performance cluster 202. The same or analogous parts are labeled with the same reference numerals as in the previous drawings for more clarity.

As in the prior embodiment, specific user $U_x$ connects to cluster 202 via network 104. This time, however, untrusted client device 204 is embodied by a mobile phone. Phone 204 uses wireless medium 104' to make network connection 104 and gain access to a distributed file system 206 on cluster 202. Distributed file system 206 contains many ciphertext files $F_c$. File system 206 is using the file securing methods of the invention already described above in encrypting ciphertext $F_c$ files from plaintext files $F_p$.

For reasons of clarity, only node 108B with its storage resources 112B is shown explicitly in FIG. 4. The blocks of storage resources 112B are formatted into blocks C that contain data in ciphertext form. In fact, blocks C contain ciphertext files $F_c$ of distributed file system 206. The j-th ciphertext file $F_{c,j}$ belonging to file system 206 and stored in a single block $C_r$ of storage resources 112B of node 108B is shown explicitly in an exploded view portion.

Computer system 200 has a module 208 that integrates key manager 118 with policy engine 122. In some embodiments, module 208 can be embodied by corresponding hardware and software resources of a slave or a master node of computer cluster 202.

Upon establishment of secure and mutually authenticated connection between user $U_x$ and computer system 200 in cluster 202, user $U_x$ requests access to ciphertext file $F_{c,j}$. This is performed in accordance with the description provided above, namely by deploying user key $KU_x$ to decode per-block key $BK_j$ from wrapped key $CK_j$. Then, decrypted per-block key $BK_j$ is employed to decode ciphertext block $C_r$ containing ciphertext file $F_{c,j}$. Upon completion of the decryption process user $U_x$ is in possession of decrypted plaintext file $F_{p,j}$.

At this point, user $U_x$ desires to write a new block by adding data to plaintext file $F_{p,j}$. To write this new block, user $U_x$ sends a write request 210. Write request 210 identifies the location of the intended block to be written to policy engine 122 in module 208. Engine 122 looks up user $U_x$, the block location and the file/block permissions in its policy database to determine the permissions associated with user key $KU_x$.

If cleared, the code on user's device 204 generates a block key $KB_s$ for encrypting the added data in new block $C_s$ in accordance with the above-described procedures. Note that in this example data is being appended in new block $C_s$ rather than being overwritten in already existing block $C_r$.

Figure 5:
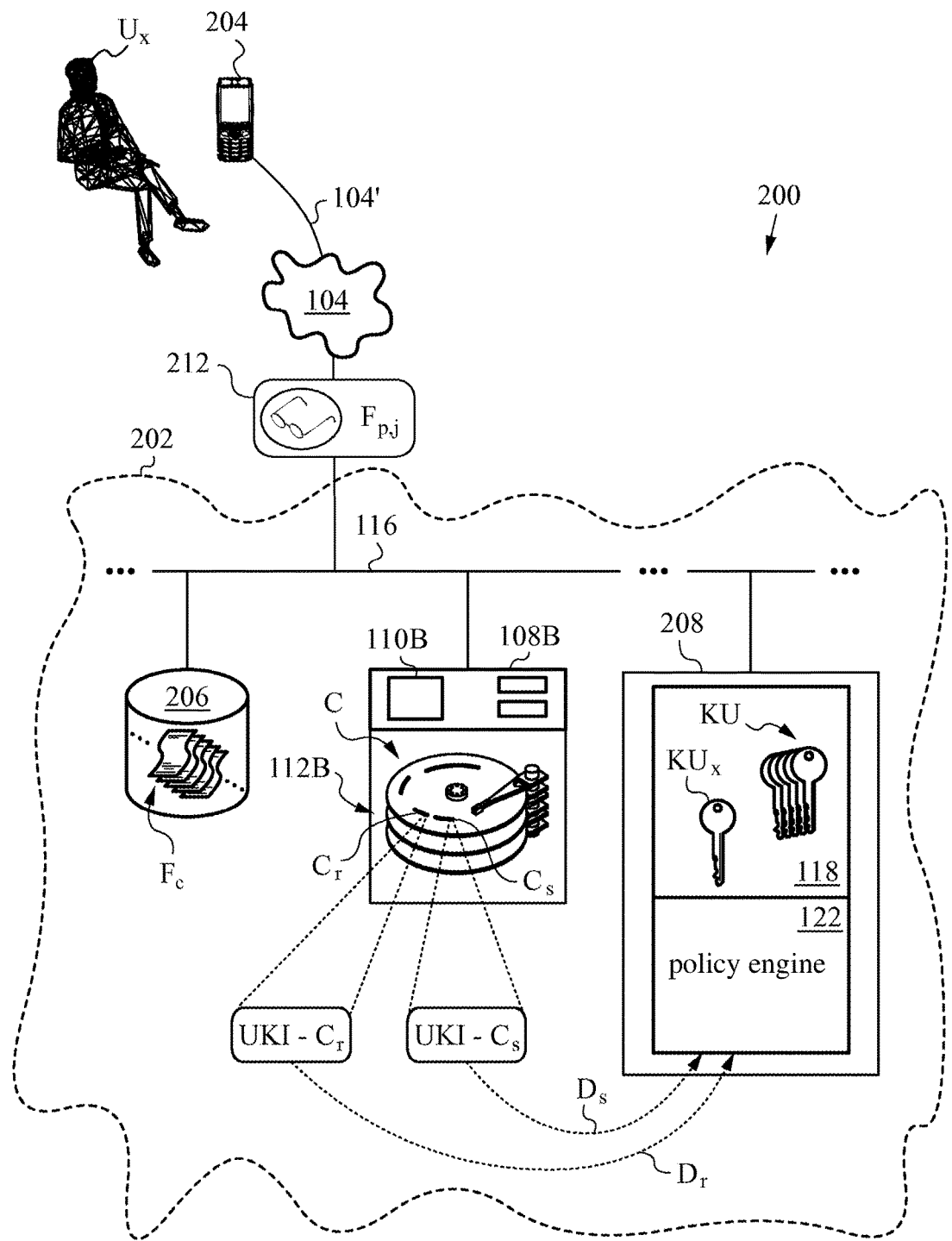
FIG. 5 is a diagram of the computer system and method of FIG. 4 while executing a read request.

FIG. 5 illustrates the same embodiment of computer system 200, in which, at some later time, user $U_x$ issues a read request 212. Read request 212 is directed to ciphertext file $F_{c,j}$ that had been previously modified by user $U_x$ by appending to it some additional data. Based on the previous user actions, updated ciphertext file $F_{c,j}$ of distributed file system 206 occupies physical blocks $C_r$ and $C_s$ in storage resources 112B.

In accordance with an additional security aspect implemented in the present embodiment of the invention, user key IDs are deployed to identify which user key has been used to wrap the block key. This allows for multiple user keys per user and/or for user keys that are shared between users. To this end, each block containing a ciphertext file $F_c$ belonging to distributed file system 206 carries, preferably in its header, user key IDs (UKIs) for users that are allowed access. The UKIs are used by policy engine 122 in granting users access to keys in key manager 118.

Returning to our example, user $U_x$ has just submitted read request 212 for ciphertext file $F_{c,j}$ in blocks $C_r$ and $C_s$. Hence, user key IDs (UKIs) for these two blocks, namely UKI-$C_r$ and UKI-$C_s$ need to be collected. In particular, user key IDs UKI-$C_r$, UKI-$C_s$ are collected and submitted to policy engine 122 in module 208 as shown by dashed arrows $D_r$, $D_s$. Of course, in this collection process user key IDs UKI-$C_r$, UKI-$C_s$ are actually remitted to engine 122 via interconnections 116 of cluster 202.

Engine 122 decides, based on identity and authentication of user $U_x$, if client device 204 that user $U_x$ is employing is allowed access to any user keys KU, as identified by user key IDs UKI-C. If it is, then engine 122 can allow user $U_x$ access to user keys KU.

In the present case, user $U_x$ has not been suspended, disqualified or even removed since writing file $F_{c,j}$ in blocks $C_r$ and $C_s$. Therefore, engine 122 identifies the user keys from key IDs UKI-$C_r$, UKI-$C_s$ and then determines if user $U_x$ has retained their authorization to use the identified user keys $KU_x$. If so, then engine 122 sends the corresponding release to key manager 118 for user keys $KU_x$. User keys $KU_x$ are then returned to user $U_x$, who can now use them to read and perform any other authorized actions to file $F_{c,j}$.

A person skilled in the art will recognize at this point that the central aspects of the invention can be implemented in many ways. First and foremost, it is clear that there can be more than one user key KU per user U. Furthermore, user keys KU can be shared between groups of users U. Using the level of indirection provided in the present invention also means that adding additional user keys KU only requires that the block key KB be encrypted in the added user key KU rather than encrypting the entire block in the added user key, as would have been typical in prior art systems.

In practical implementations almost any particular user U will be a member of a group of authenticable users working on untrusted client devices. In those situations the user key KU can be shared among the group. In administering such situations, it is advantageous to introduce one or more permission zones that are defined by a mapping between the users and a set of permissions. The user key KU can then be shared with the zone or zones based on the established mapping. Establishment of such mappings is well within the capabilities of skilled artisans.

In the event of a compromised user key KU, the affected key is revoked from user U (or users). This means that key KU can no longer be used by that user (or users). This process does not force any re-encryption of the files in the distributed file system or any other file system in which the invention is practiced. Of course, this is due to the fact that the files are encoded in the per-block keys BK, which are not compromised together with the user key(s). Indeed, deployment of the methods of invention in a stackable or layered file system where there is isolation of the encryption functionality from the details of the physical file system is thus very advantageous. In this way, the encryption layer can be reused for many physical file systems.

The present "layered approach" to security under the semi-trusted client model is particularly well-adapted to modern mobile environments. In fact, the computers system of the invention supports applications where users access the file system from many mobile and stationary devices at different times and from different locations. Thus, the untrusted client device can be any mobile user device that may not be the user's permanent or even preferred device. In general, the untrusted client device can be a mobile phone, a mobile computer, a tablet computer and any one of a large and growing number of thin client devices that include sensor-based computing units on the Internet of things.

It is also noted that breaking up the storage units into segments other than blocks may be practicable in some systems. For example, depending on file sizes and types, a per-file approach can be implemented.

Now we will discuss a set of related embodiments of the instant invention that utilize such a per-file approach in detail. For ease of explanation, and as practicable, we will continue to use the same terminology to refer to the various modules and their functions as before.

Figure 6:
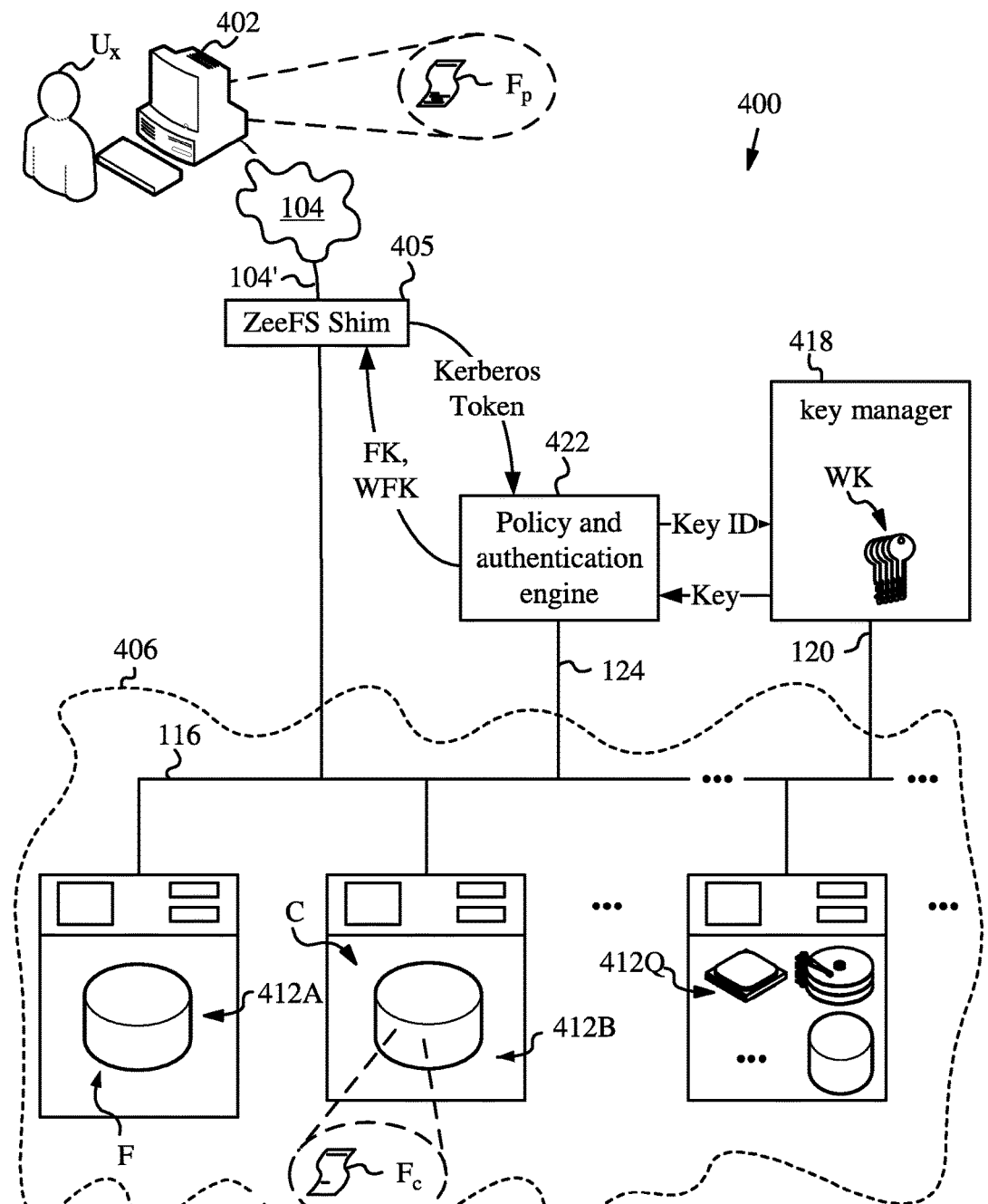
FIG. 6 is a high-level diagram illustrating the main aspects of an alternative set of embodiments that use a per-file file key FK approach to securing a computer system associated with the semi-trusted client threat model according to the invention.

The per-file approach utilizes a unique file key to encrypt each plaintext file. To understand this approach let us first consider the embodiment 400 shown in FIG. 6 based on our semi-trusted client threat model. FIG. 6 is a variation of FIG. 1 of earlier embodiments with some important differences. Note that several reference numerals from FIG. 1 have been omitted for clarity and to avoid undue repetition but their presence and functions will be understood by those skilled in the art. Plaintext file $F_p$ being accessed by an authenticable user $U_x$ via network 104 using an untrusted client device 402, is assigned a file key FK with which it is encrypted and stored as encrypted ciphertext file $F_c$ in secure distributed file system 406.

Further, each file key FK is wrapped/encrypted using a wrapping key WK. Wrapping key WK is stored in key manager 418. In the present embodiments, key manager 418 does not generate keys, but rather it only stores wrapping keys that are used to wrap individual file keys $FK_k$ corresponding to each file $F_{p,k}$. However, in a variation, key manager 418 can also generate keys in addition to storing them. As with earlier embodiments, it is understood for this embodiments, that user $U_x$ is one of many (dozens, hundreds or thousands or more) users of system 400 of FIG. 6.

In order to access distributed file system 406 of the present embodiments, a compatibility or "shim" layer 405 is provided above the Application Programming Interface (API) of distributed file system 406. Those skilled in the art will understand that file system API consists of various types of file system requests/commands that may be issued by a client. Some exemplary file system requests operable on files in file system 406 would include read, write, update, create, delete, etc. It will also be apparent to those skilled in the art, that in practice shim layer 405 will first interface with the client-side portion of file system API which in turn will interact with the corresponding server-side file system API of file system 406. However, for clarity in the illustrations and the below explanation, we will omit these obvious details.

Shim layer 405 is responsible for intercepting and servicing all file system requests generated by user $U_x$ on client 402. The general workings and mechanism behind such a 'compatibility' or shim layer will be familiar to those skilled in the art. Shim 405 would also be used by any standard command line programs that access file system 406, so that they would work without requiring any modifications to them.

Policy engine 422 governs as to which parts of file system 406 are to be encrypted. It houses this information in a security or configuration policy. The configuration/security policy further contains configuration information that determines whether a wrapping key WK applies to a single file, or all the files in its directory, or all the files in a directory tree. Because of the isolation between user $U_x$ and his/her access to file system 406 via shim 405, afforded by the wrapping keys, it is possible in the present embodiments to share a wrapping WK amongst several files, directories or directory trees. This will further become apparent by the operational details of the system explained below.

The policy further includes the key rotation time periods applicable to various parts/sections of file system 406 governed by the encryption regime. These time periods dictate as to how often the wrapping keys and file keys for various sections of file system 406 that are encrypted, need to be replaced.

According to the present embodiments, each block of a plaintext file $F_p$ is encrypted with the same file key FK. However, as each block is encrypted, the initialization vector (IV) that is used to seed the file key FK is changed based on the block ID of the block being encrypted.

Now let us see how an authenticable user $U_x$ of our semi-trusted authentication model writes/creates/updates a plaintext file $F_p$ according to the present embodiments. As a first step, user $U_x$ is authenticated by policy engine 422, preferably using a standard authentication protocol such as Kerberos. More specifically, shim 405 which is also referred to in FIG. 6 as 'ZeeFS Shim' based on an exemplary implementation, transparently passes the Kerberos authentication token from client device 402 to policy engine 422. Policy engine 422 receives the Kerberos token and authenticates the credentials of user $U_x$. The mechanisms for Kerberos authentication will be well known to those skilled in the art and will not be delved into detail in this explanation. If authentication fails, an error is returned to user $U_x$ and the operation is generally aborted.

Only after user $U_x$ is properly authenticated, he/she can then successfully issue any file system requests to underlying distributed file system 406. If user $U_x$ wishes to store a new file $F_p$ into file system 406, then policy engine 422 will generate a new file key FK for file $F_p$. If it is a new file, then depending on the configuration of file system deployed in the configuration policy of policy engine 422, a wrapping key WK for file $F_p$ may already exist. In other words, an existing wrapping key WK may be applicable to file $F_p$, because it is being shared by multiple files and/or directories as explained above. If, however, no such wrapping key WK is applicable to new file $F_p$, then policy engine 422 generates a new wrapping key WK for file $F_p$. If $F_p$ is an existing file, then WK would certainly already exist. In either case, WK would be stored in key manager 418. Policy engine 422 now queries key manager 418 for wrapping key WK, or in the case where it has generated a new WK, it then sends it the new WK and WK ID for storage.

While in the below teachings and the associated illustrations it is assumed that policy engine 422 is responsible for generating keys, as already stated, this task can also be done by key manager 418 in alternative variations. Note further that in the following explanation, while referring to a plaintext file $F_p$, it is understood that file $F_p$ is never stored in file system 406 as a plaintext file. It would only exist in file system 406 in its encrypted ciphertext form $F_c$. Therefore, all references to a new or existing file $F_p$ and its metadata in file system 406 are understood to apply to its encrypted, ciphertext counterpart $F_c$. In fact, we may use references $F_p$ and $F_c$ interchangeably, knowing that the file will always exist in its encrypted form $F_c$ in file system 406.

Now, let us return to how specifically policy engine 422 queries and communicates with key manager 422 for wrapping key WK. If $F_p$ is an existing file, or more precisely if its encrypted, ciphertext counterpart $F_c$ is an existing file, then policy engine 422 retrieves the key ID of its wrapping key WK, i.e. WK ID, from its metadata. Before reading any metadata attribute, policy engine 422 first verifies the integrity of the metadata using a message authentication code (MAC) algorithm as will be further explained below. If MAC verification fails, an error is returned.

On the other hand, if $F_p$ is a new file, or more precisely if its encrypted, ciphertext counterpart $F_c$ is a new file then policy engine 422 will read the WK ID of its wrapping key WK from the metadata of the parent directory or directory tree whose WK is applicable to $F_p$. It then sends this WK ID to key manager 418 that in response sends the corresponding wrapping key WK to policy engine 422.

If however, the configuration of file system 406 dictates that a new wrapping key WK be generated for the file, then engine 422 would generate the new wrapping key WK. In this case, it would then send the new WK and a corresponding WK ID to key manager 418 for storage and later retrieval. It would also save the new WK ID in file metadata for subsequent querying of key manager 418. In an alternative embodiment, policy engine 422 will only send the newly generated wrapping key WK to key manager 418. Key manager 418 will then assign a WK ID to the new WK and communicate that WK ID to engine 422 for saving in file metadata. In any case, the automatic generation of new file key FK and wrapping key WK is an important benefit of the present embodiments, affording a smooth and reliable operation of the system.

If an existing wrapping key WK was used for file $F_p/F_c$ per above, then policy engine 422 also reads the corresponding wrapped file key WFK from the metadata of the existing file or its directory or directory tree whose WK was used. It then unwraps WFK with WK obtained/generated above, to attain the corresponding file key FK. In the case of a new file $F_p/F_c$, policy engine 422 would generate a new FK as already explained above. In this case, it wraps the new file key FK with WK obtained/generated above, to attain the corresponding wrapped file key WFK. It then sends this WFK and FK to shim 405.

Figure 7:
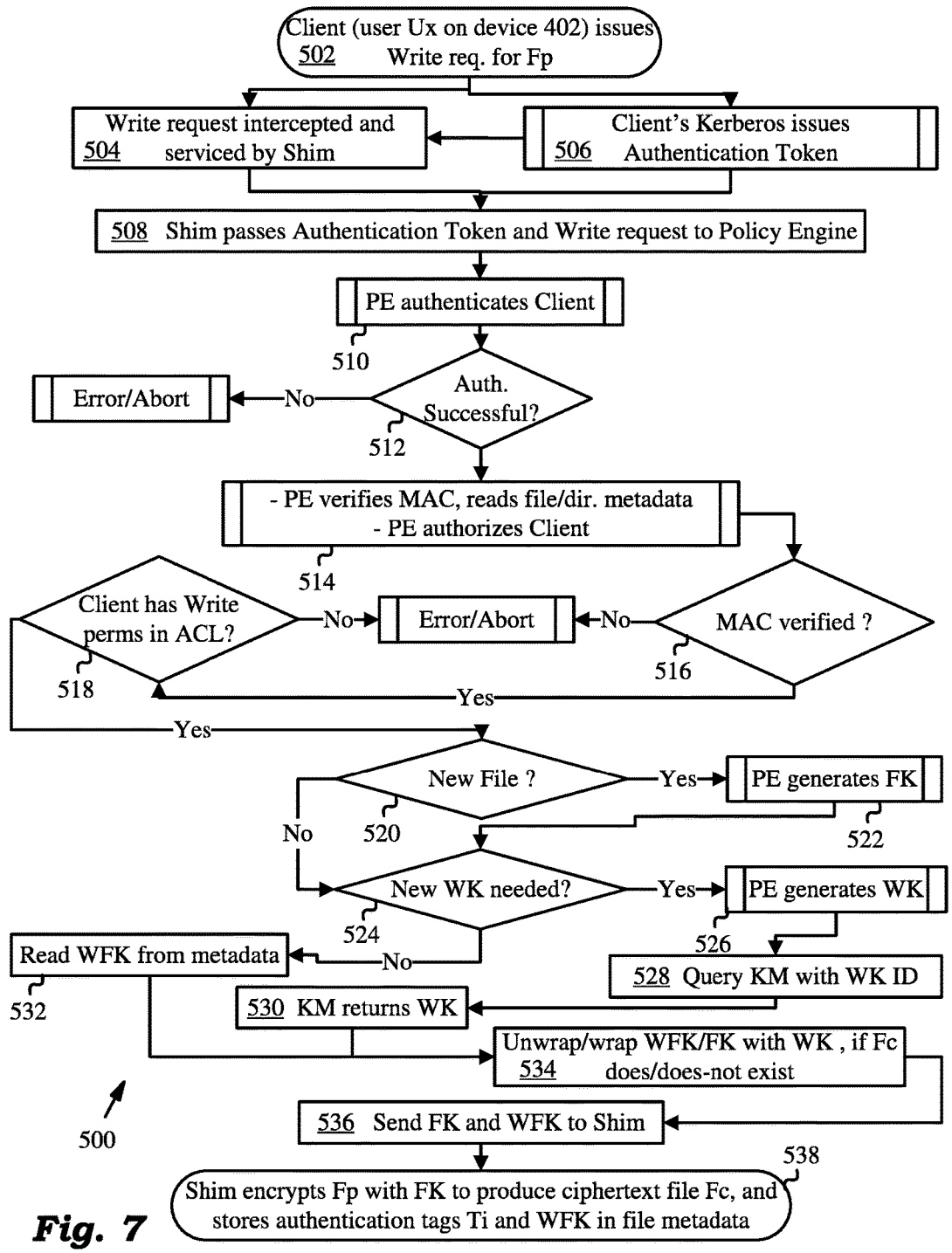
FIG. 7 is a high-level flowchart illustrating how write (and related create/update) file operations may be performed in the embodiments of FIG. 6.

Shim 405 now encrypts plaintext file $F_p$ at client device 402 with the above received file key FK. It then subsequently issues write file system requests to write encrypted file $F_c$ and its metadata into file system 406 as will be explained further below. As already discussed, among one of the attributes of the file metadata is wrapped file key WFK which shim 405 stores in file metadata. A flowchart 500 of the above exemplary algorithm of the invention is illustrated in FIG. 7. Note that some detailed steps from the above explanation may have been intentionally omitted from the simplified flowchart 500 of FIG. 7 for readability and clarity.

Specifically, oval shape 502 refers to the start of the process with the issuance of the write/create/update file system request. Box 504 refers to the interception and servicing of the request by shim 405. Boxes 506, 508, 510 and decision diamond 512 cover the authentication of user $U_x$ by policy engine 422 per above explanation. If authentication is successful, box 514, decision diamonds 516 and 518 cover MAC verification of the metadata and reading of the metadata by policy engine 422 and subsequent authorization. If authorization is successful, decision diamond 520 and box 522 cover the new file (create) scenario. Decision diamond 524 and box 526 cover the determination of whether a new wrapping key WK is needed per above teachings.

Boxes 528, 530 and 532 cover reading of wrapped file key WFK from metadata and obtaining WK from key manager 418. Box 534 covers for existing file scenario (write/update) unwrapping of existing wrapped file key WFK with wrapping key WK to obtain corresponding file key FK, and for new file scenario (create) wrapping of new file key FK to generate wrapped file key WFK. Box 536 covers transmission of FK and WFK to shim 405. Finally, oval shape 538 covers encryption of the file by shim 405 and subsequent writing into its metadata per above explanation.

In the present embodiments, since each file is encrypted using a single file key FK, additional measures are taken to ensure the security of the files in the file system. Specifically, the initialization vector (IV) for file key FK is varied for each block of file $F_p$. More precisely, as each block of file $F_p$ is encrypted, the initialization vector (IV) of file key FK is changed based on the block ID of the block encrypted. Preferably, the IV for each block of file key FK is just the block ID of the block being encrypted.

Such a scheme ensures that FK is constantly evolving as file $F_p$ is encrypted, block by block. Furthermore, since IV of FK is based on block ID that means that it is unnecessary to store the IV in the file metadata. If however, a block in the file is ever overwritten or truncated, such as by a seek and a write operation, then the entire block is re-encrypted. In this case, since re-using the same IV for the block would be insecure, a new IV for the overwritten block is randomly generated, the block is re-encrypted with the FK using the new IV, and the new IV is stored in the file metadata.

Preferably, file is encrypted block by block using the Advanced Encryption Standard (AES) in Galois/Counter Mode (GCM) mode. The advantages of such a GCM mode of symmetric key cryptographic block ciphers are high efficiency and performance. The encryption of each block $M_i$ of file $F_p$ by shim 405 produces a corresponding ciphertext block $C_i$ and an authentication Tag $T_i$. These authentication tags are then stored in the file metadata. As each block $M_i$ of plaintext file $F_p$ is encrypted, resulting ciphertext block $C_i$ is written to ciphertext file $F_c$ and tag $T_i$ is written into the metadata of file $F_c$. Once again the reader is reminded that since plaintext file $F_p$ is always stored in file system 406 in its encrypted ciphertext form $F_c$, its metadata can be referred to as belonging to file $F_c$ or equivalently $F_p$.

The key advantage of writing tags $T_i$ to encrypted file $F_c$'s metadata is that during a read operation (see further below), the integrity of each encrypted block $C_i$ can be verified using tag $T_i$. Those familiar with the GCM mode of symmetric key cryptography will understand the mechanisms involved in verifying the integrity of encrypted ciphertext block $C_i$ using the GHASH function and the corresponding authentication tag $T_i$. These mechanisms are well published and understood and will not be delved into detail here. Suffice it to say, that given a plaintext block $M_i$, a corresponding ciphertext block $C_i$ and an authentication tag $T_i$, a GCM implementation will able to verify the integrity of ciphertext block $C_i$ to ensure that it has not been in any way modified/adulterated to compromise the production of the original plaintext block $M_i$ after decryption.

Before proceeding to explain the behavior of a read operation of an encrypted file $F_c$, let us take a detailed look at the contents of the file metadata. In the preferred embodiment, file system 406 is a Hadoop Distributed File System (HDFS). Preferably, the file metadata is stored in the POSIX-compliant extended attributes of HDFS. Alternately, the file metadata may also be stored or appended to other parts of the file, or alternatively still other implementations of extended attributes may be pursued. The number of such design choices are many as will be appreciated by skilled artisans.

According to the present embodiments, the metadata of encrypted file $F_c$ includes the following attributes. An associated explanation is also provided for each attribute:

1. Authentication tags $T_i$ for encrypted blocks $C_i$ of the file: As already explained above, an authentication tag $T_i$ is produced during the encryption of each plaintext block $M_i$ by shim 405 along with ciphertext block $C_i$. Tag $T_i$ is then stored by shim 405 in file's metadata, while ciphertext block $C_i$ is stored as a part of the contents of ciphertext file $F_c$. During decryption, as detailed under read operation below, shim 405 checks the integrity of each ciphertext block $C_i$ based on its corresponding tag $T_i$ read from file's metadata. The block is then decrypted once its integrity has been verified.

2. A map/list of block ID's of blocks of the file that were modified/adulterated and the corresponding Initialization Vectors (VI's): Recall that an IV only need be stored in file metadata if it was randomly generated after a modification/adulteration of the corresponding ciphertext block. In this case the block was re-encrypted by the newly generated IV and the IV was then stored in the metadata.

3. Access Control List (ACL): An ACL governs access to the file such as which user groups the file belongs to, and which users have what type of privileges (read, write, update, delete, etc.) on the file. An ACL is checked by policy engine 422 to determine if user $U_x$ after his/her authentication, has the necessary privileges to perform the desired operation on file $F_c$. This step in the art is also referred to as authorization, distinct from authentication which verifies the credentials of user $U_x$ to be a bonafide user of system 400 of FIG. 6. Obviously, if any of the steps of authentication or authorization is unsuccessful, an error is returned to user $U_x$ and the operation is typically terminated.

4. Wrapping Key WK ID: As already explained above, that during a write operation, policy engine 422 may query key manager 418 for wrapping key WK or it may generate a new WK. If it generated a new WK, it then saves the ID of the new WK, i.e. new WK ID, in file metadata and sends this new WK ID and new wrapping key WK to key manager 418 for storage and subsequent querying. Policy engine 422 then wraps file key FK in WK to obtain a WFK (or if the file already existed, it reads the WFK from file metadata per earlier explanation). It then releases/sends file FK, along with WFK, to shim 405. Shim 405 then encrypts plaintext file $F_p$ with file FK and writes this metadata attribute while/after writing corresponding ciphertext file $F_c$.

During a read operation (as will be further explained below), policy engine 422 queries key manager 418 for WK, by sending it WK ID read from the metadata of ciphertext file $F_c$. It then unwraps WFK with WK to obtain FK, which is then released/sent to shim 405 for decryption of the file—after proper authentication, authorization and MAC verification of metadata, as explained in these teachings.

5. Wrapped File Key WFK: As explained above.

6. Key rotation time: Last date/time a key rotation was performed on FK and WK. As explained earlier, the configuration file of policy engine 422 includes the time periods as to how often key rotations of each FK and WK in various sections/parts of file system 406 has to be performed. If key rotation time attribute of metadata of file $F_c$ indicates that the last time a key rotation was performed is greater than or equal to the key rotation interval specified in policy engine 422's configuration file, then a key rotation of FK and WK is performed for file $F_c$.

Specifically, policy engine 422 decrypts file $F_c$ using old file key $FK_{old}$ to obtain original plaintext file $F_p$, generates a new file key $FK_{new}$, re-encrypts file $F_p$ block by block according to above explained scheme to obtain a corresponding ciphertext file $F_c$, generates a new wrapping key $WK_{new}$, wraps $FK_{new}$ with $WK_{new}$ and re-writes the file metadata of new file $F_c$ with the updated value for key rotation time attribute (as the current time/day when key rotation was just performed). A person skilled in the art will appreciate the mechanics behind key rotations, and various available design choices one can make in the practice of the invention, and without departing from its principles.

In additional variations, key rotation of file key FK can be performed independently of the key rotation of wrapping key WK. Since FK rotation requires re-encrypting the file data, that is a lot more resource intensive operation than just rotating wrapping key WK. Therefore, it is advantageous to separate the two functions and execute them as warranted.

Now that we understand the contents of the metadata of ciphertext file $F_c$, let us further understand how the present embodiments ensure the integrity of this metadata. According to the invention, file metadata is itself protected from tampering/adulteration or unauthorized modification by an adversary or a hacker. This is accomplished by the use of Message Authentication Code (MAC) for the protection of the metadata. Those skilled in the art will know that a MAC is a piece of information used to authenticate and verify a message. In other words, MAC is used to confirm that the message came from the stated sender (its authenticity) and has not been changed in transit (its integrity). A MAC algorithm accepts as input a secret key and an arbitrary-length message to be authenticated, and outputs a MAC (sometimes also known as a tag). The MAC or tag protects both a message's data integrity as well as its authenticity, by allowing verifiers (who also possess the secret key) to detect any changes to the message content.

According to the invention, policy engine 422 uses MAC algorithm to generate a corresponding MAC for all metadata contents 1-6 above and that MAC is also stored into the metadata of file $F_c$. Preferably, the secret key of the MAC algorithm used, is based on FK. Preferably, the hash function used in the MAC algorithm is Secure Hash Algorithm 2 (SHA-2). In an alternative variation, policy engine 422 produces a MAC value for each individual field 1-6 of metadata above, and stores these individual Hash-based MAC values into the metadata of file $F_c$ (along with the metadata fields 1-6).

We are now ready to understand how a read operation is performed on file system 406, according to the present embodiments of the invention.

Let us assume that user $U_x$ desires to read a file $F_c$ that is stored in secure distributed file system 406 in encrypted form as per above techniques. Recall that user $U_x$ accesses file system 406 via network 104 and through shim layer 405 (labeled as ZeeFS Shim) in FIG. 6. Unsurprisingly, the first step is that of authentication. Specifically, shim layer 405 passes Kerberos token generated for user $U_x$ using un-trusted client device 402, to policy engine 422. Using the Kerberos token policy engine 422 authenticates user $U_x$ on device 402. If the authentication is unsuccessful an error is returned and the read operation is terminated.

If the authentication is successful, policy engine 422 then reads the metadata of file $F_c$ and verifies its integrity based on the stored MAC values. Based on the specific MAC algorithm implemented, policy engine 422 verifies using the stored MAC values in the metadata, whether the metadata attributes 1-6 above have been tampered with or not. If they are, an error is returned. If the integrity of file metadata is verified, then policy engine 422 reads the ACL and authorizes user $U_x$ for the intended (read) operation. If the authorization is unsuccessful an error is returned and the operation is usually terminated.

If the authorization is successful, policy engine 422 reads WK ID from the metadata and queries key manager 418 for WK. Key manager 418 returns the corresponding WK. Policy engine 422 then decrypts/unwraps WFK read from the metadata with WK obtained from key manager 418, to obtain corresponding file key FK for encrypted ciphertext file $F_c$. It then releases/transmits FK to shim 405.

Figure 8:
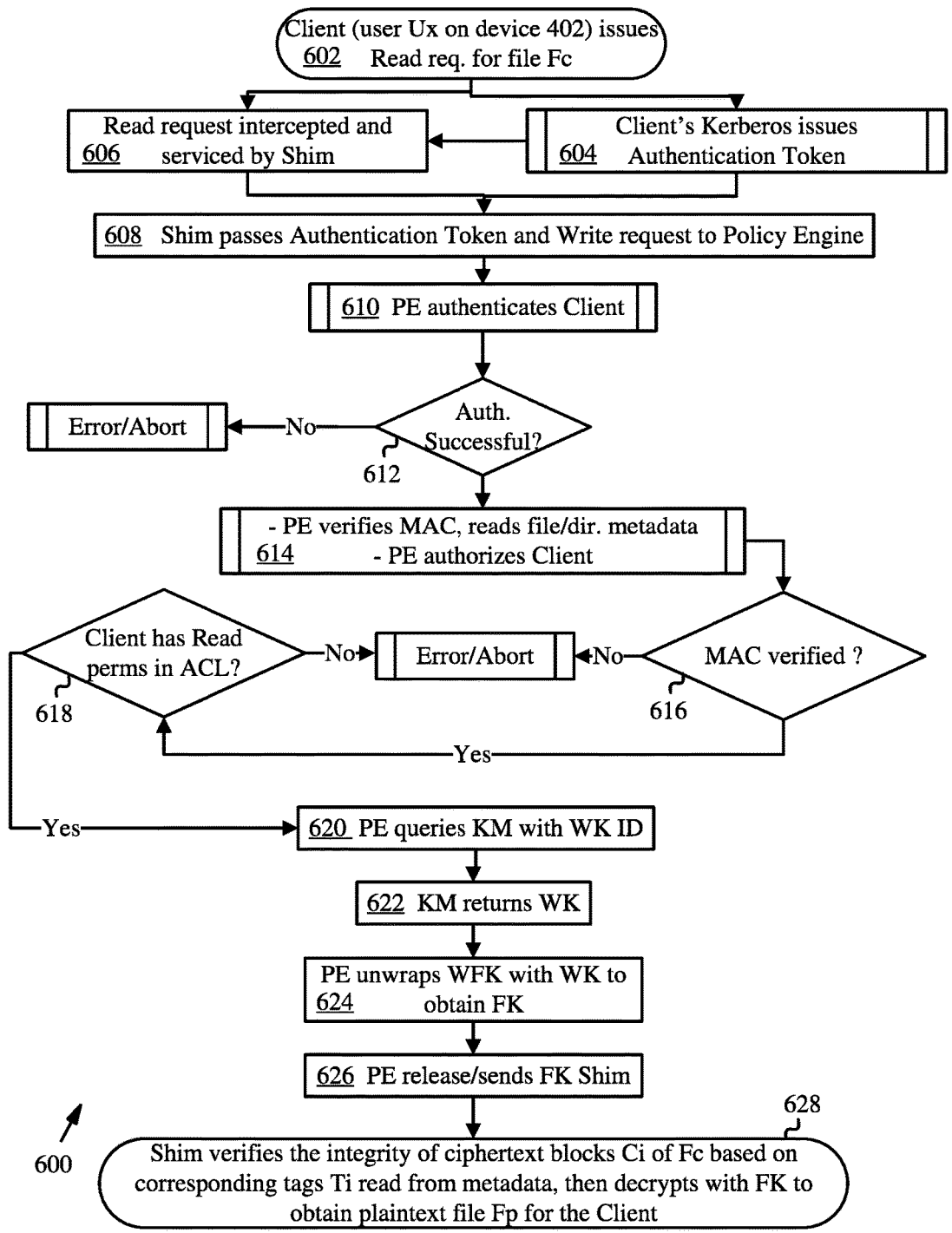
FIG. 8 is a high-level flowchart illustrating how a read operation may be performed in the embodiments of FIG. 6.

At this point, shim 405 is ready to decrypt ciphertext file $F_c$. In doing so, it first verifies the integrity of each ciphertext block $C_i$ of file $F_c$ by reading the corresponding tag $T_i$ from the file's metadata (after verifying the integrity of metadata based on MAC as explained above). If the integrity of block $C_i$ is verified, shim 405 decrypts ciphertext block $C_i$ of file $F_c$ by FK to obtain the corresponding plaintext block $M_i$ of original plaintext file $F_p$. If the integrity check fails, an error is returned. This way shim 405 decrypts entire ciphertext file $F_c$ to obtain the original plaintext file $F_p$ block by block. User $U_x$ on untrusted client device 402 can then read/access file $F_p$ to complete the read operation. The above operation is illustrated in an exemplary and simplified flowchart 600 in FIG. 8, where all the detail steps of the above explained operation may not have been visualized.

Specifically, the process starts with the issuance of the file system request as referenced in the oval shape 602. Boxes 604, 606, 608, 610 and decision diamond 612 cover authentication per above explanation. If authentication is successful, box 614, decision diamonds 616 and 618 cover MAC verification and authorization per above explanation. If authorization is successful, boxes 620, 622 and 624 cover reading WK ID from file metadata, querying key manager for wrapping key WK in exchange and unwrapping wrapped file key WFK read from metadata to produce file key FK. Box 626 covers release of file key FK to shim 405. Finally, oval shape 628 covers verification of ciphertext file $F_c$'s contents by shim 405 based on authentication tags $T_i$ and decryption of the file using file key FK.

With the above provided operational details of system 400 of FIG. 6, including the metadata contents, write/update/create and read operations, including the cases where a file is new (i.e. create operation) or if it already exists (i.e. update operation) in file system 406, one skilled in the art will easily appreciate how to perform other related operations on file system 406. For example, a delete operation will be the converse of create, which as mentioned, is already covered under the details of the write/update/create operation.

Specifically, a file deletion initiated from shim 405 will first trigger authentication and authorization by policy engine 422 as will be apparent by now. A success in those steps is followed by determining if the file's WK was only applicable to the file itself. If so policy engine 422 transmits its WK ID read from file's metadata to key manager 418 so that key manager 418 can remove the corresponding WK from storage. However, if the file to be deleted had a shared WK, then the last step is skipped. Subsequently, policy engine 422 removes the file and its metadata from file system 406 and sends an acknowledgement to shim 405 that the file has been deleted.

It is also conceivable within the scope of the invention to have a simplified variation of file deletion. In such a variation, as before, when a file is deleted, its FK is also deleted. However, since the housekeeping for determining if the WK of the file is being shared by other files/directories may be costly, the WK is not deleted. Instead, when deemed appropriate, the administrator is able deliberately change the state of the WK to "retire", instead of deleting it outright. In either variation, one reason for keeping older keys as retired instead of deleting them, is for decrypting a restored backup.

A main advantage of the present embodiments of the invention is that data in-transit between the client (user $U_x$ on client device 402) and cluster 116 of file system 406, stays in encrypted form. Those skilled in the art will appreciate that a hallmark of a secure system is that the data should stay secure or encrypted both at-rest i.e. on the storage devices, as well as in-transit i.e. while being transferred between various nodes or modules of the system. It is easy to see that the present embodiments satisfy these both security criteria. Furthermore, wrapping key WK is never revealed to the client. So, the compromise of one file key FK can never jeopardize the security of more than one file in the system.

As with earlier embodiments, it is preferable for the present embodiments that connections 104', 124, 120 between the untrusted client device 402, shim 405, policy engine 422 as well as key manager 418 be secure and mutually authenticated connections. That is at least because, and as explained above, shim 404 communicates Kerberos token to policy engine 422 and which then communicates file key FK to shim 405. Similarly, key manager 418 communicates wrapping key WK to policy engine 422. In the absence of a secure connection for the transmission of the above keys, a key exchange protocol may need to be utilized. Those skilled in the art will understand the workings and requirements for implementing such a secure key exchange mechanism.

As will be apparent by now that when policy engine 422 needs a FK, it reads the file metadata after proper authentication, authorization and MAC verification of the metadata. It then requests the WK from key manager 418, by querying it with the WK ID read from the metadata. Although not required, having key manager 418 be a discreet component allows the use of commercial off the shelf key managers, such as a Key Management Interoperability Protocol (KMIP) server e.g. IBM's Distributed Key Management System (DKMS), HP's Enterprise Security Key Manage (ESKM), or Amazon's Key Management Service (KMSM), etc. As an additional safeguard typically expected in a high-grade security environment such as the one supported by the instant invention, the keys can be further secured in a hardware security module (HSM).

When files are created, a FK is automatically generated and wrapped in a WK by the policy engine. When a file is moved or copied from another part of the file system, if it is required, the policy engine will re-wrap the FK in the WK appropriate for the destination. This allows move and copy operations to be supported with no special action by the user. By deploying the configuration file of the policy engine, as explained earlier, encryption can be enabled or disabled in various parts of the file system, or the keying policy changed, while the distributed file system is running and being used.

Figure 9:
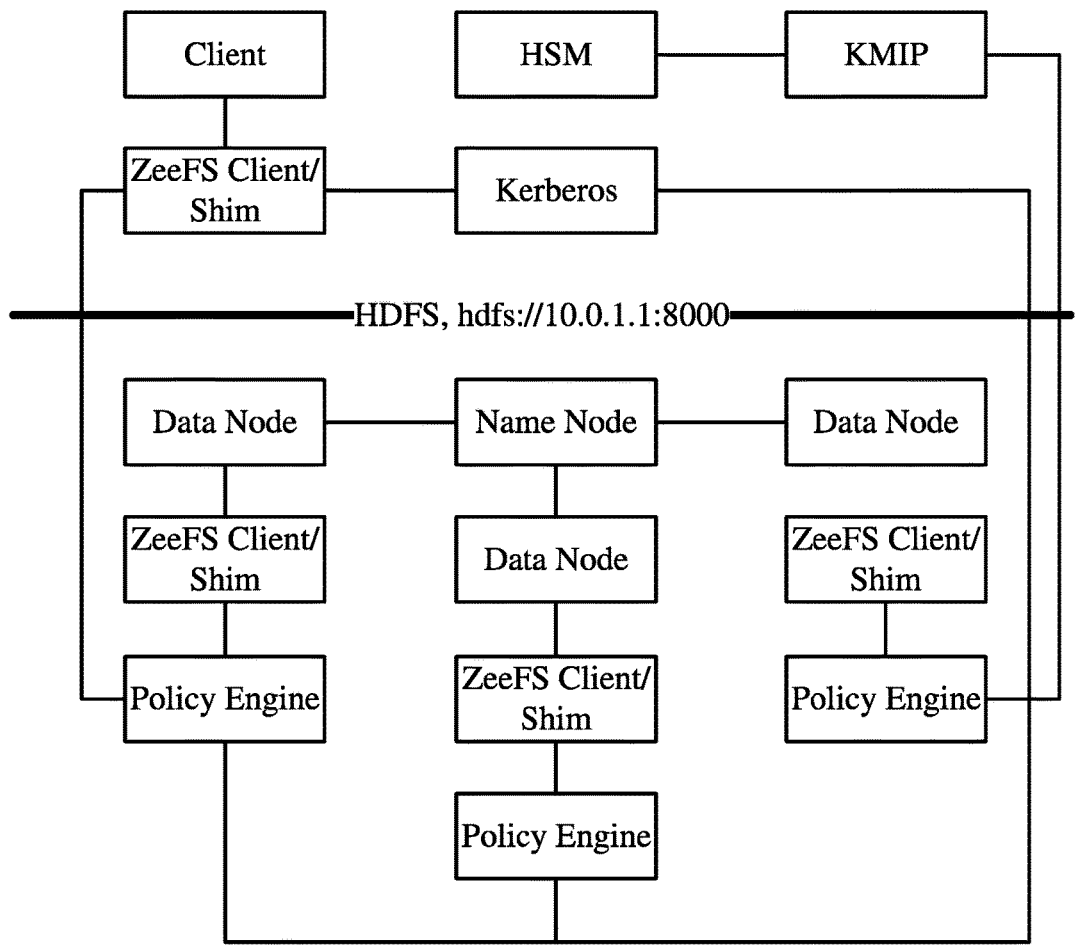
FIG. 9 is a diagram illustrating a network topology for the embodiments of FIG. 6 that employ Hadoop Distributed File System (HDFS) as the underlying file system.

As already explained, the administrator can define which parts of the file system to encrypt, and which keying policy to apply (unique wrapping key per file, per directory, per directory tree). The policy also defines the key rotation period for each section of the file system. Preferably, the policy engine, and the shim, is deployed on all or selected nodes of a Hadoop cluster. These nodes are preferably the data-nodes of Hadoop. Each client has a secure, authenticated connection to the policy engines. An exemplary topology representing the above described embodiment 700 is shown in FIG. 9.

Figure 10:
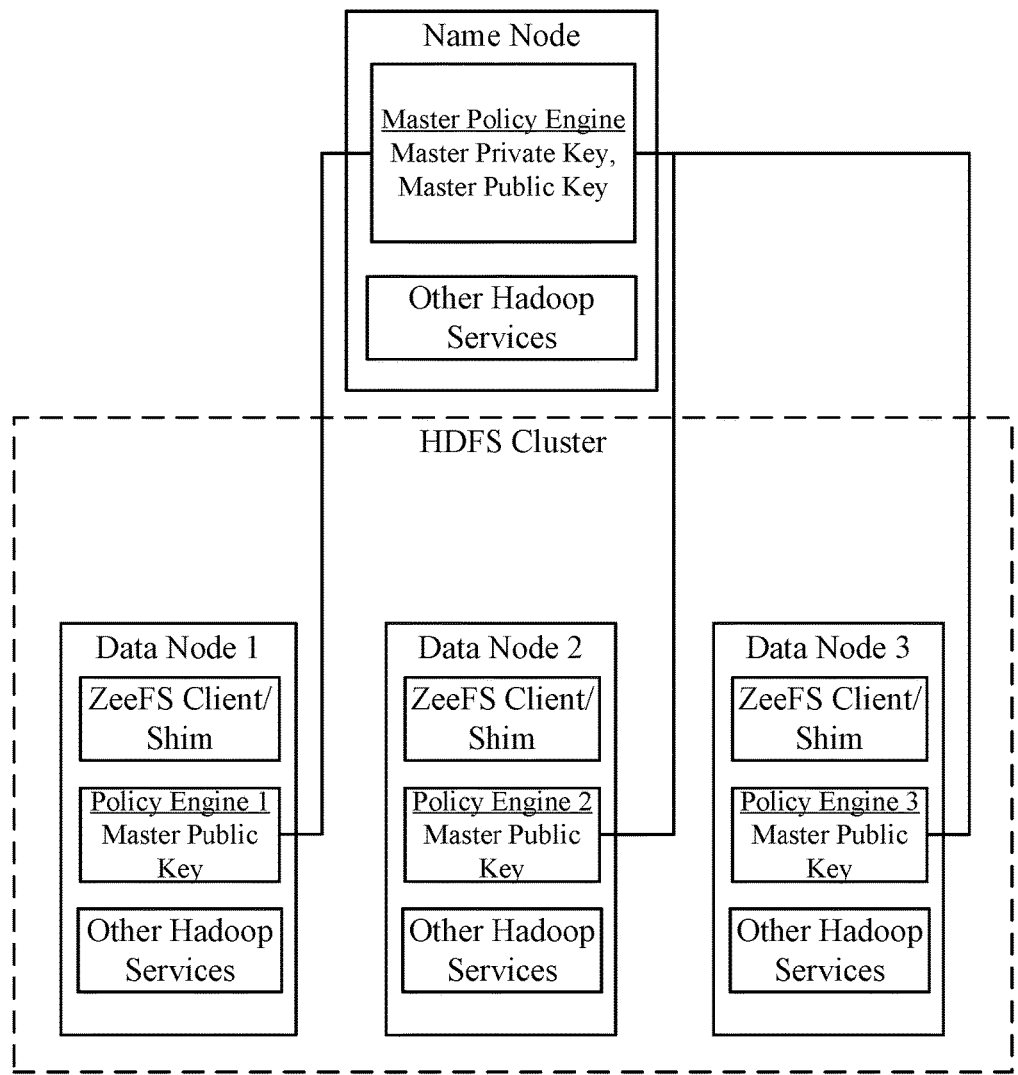
FIG. 10 is a detailed view of a master policy engine based variation of the embodiment of FIG. 9 where a master policy engine executes on the name node, and one or more policy engines execute on one or more data nodes of the Hadoop cluster.

Preferably, the policy is cryptographically signed by a public/private key pair registered to the master policy server. FIG. 10 illustrates such an embodiment 800. The master policy engine, is deployed on the name-node (or simply name node) of Hadoop cluster, and it can push new policies to the policy engines/servers (on each data-node or simply data node or datanode), and/or they can request/pull the policy updates from the master policy engine. This ensures that the policy cannot be modified by an attacker and that all the policy engines/servers have the same policy. Since the policies are typically changed infrequently and are not bandwidth-intensive, the master policy engine is a relatively lean module without requiring a lot of bandwidth and horsepower, and can be conveniently deployed on the name-node of a Hadoop cluster.

In the embodiment shown in FIG. 10, the familiar cryptographic public/private key or digital signature security paradigm well understood in the art is employed. Specifically, a master public key is shared between all policy engines. When the master policy engine distributes a new policy or a policy update, it signs/encrypts the new policy or policy update with its master private key to produce a digital signature. The signature is protected from tampering/modification because an attacker cannot correctly modify the signature in a computationally feasible manner. After receiving the signature, policy engines 1, 2 and 3 can authenticate that the received signature indeed originated from the master, because they can decrypt it using the master public key to obtain the new policy or policy update. Finally, they can deploy the new/updated configuration/security policy. The details of public key cryptography will be well understood by skilled artisans.

In view of the above teaching, a person skilled in the art will recognize that the invention can be embodied in many different ways in addition to those described without departing from the spirit of the invention. Therefore, the scope of the invention should be judged in view of the appended claims and their legal equivalents.

I claim:

1. A computer-implemented method for securing a plaintext file $F_p$ as an encrypted, ciphertext file $F_c$ in a distributed file system, said method comprising the steps of:
   (a) providing storage resources distributed in said distributed file system;
   (b) providing said storage resources to be accessible to an authenticable user $U_x$ using an untrusted client device;
   (c) assigning to said plaintext file $F_p$ a symmetric file key FK;
   (d) block by block encrypting by a compatibility shim layer, each block $M_i$ of said plaintext file $F_p$ with said file key FK to produce a corresponding authentication tag $T_i$, and a corresponding encrypted block $C_i$ of said encrypted, ciphertext file $F_c$;
   (e) inserting said compatibility shim layer on top of an Application Programming Interface (API) of said distributed file system for intercepting and servicing file system requests generated on said untrusted client device;
   (f) storing said corresponding encrypted block $C_i$ in said storage resources distributed in said distributed file system;
   (g) encrypting said file key FK by a symmetric wrapping key WK to obtain a wrapped file key WFK;
   (h) placing said authentication tag $T_i$, said wrapped file key WFK and a key ID of said wrapping key WK, in a metadata of said encrypted, ciphertext file $F_c$; and
   (i) generating and storing a message authentication code (MAC) of said metadata, for protecting said metadata from tampering by later verifying its integrity based on said MAC.

2. The method of claim 1, further storing said wrapping key WK in a key manager.

3. The method of claim 1, further using Advanced Encryption Standard (AES) in Galois/Counter Mode (GCM) mode in said step (d) of block by block encrypting.

4. The method of claim 1, further utilizing in said step (d) of block by block encrypting, an Initialization Vector (IV) to said file key FK, that is based on a block number of said block $M_i$ of said plaintext file $F_p$.

5. The method of claim 1, where prior to said step (d) of block by block encrypting, said compatibility shim layer further consults a policy engine for authenticating and authorizing said authenticable user $U_x$.

6. The method of claim 5, wherein said policy engine performs said step of authenticating using kerberos authentication protocol.

7. The method of claim 5, wherein based on the results of said steps of authenticating and authorizing, said policy engine returns said file key FK to said compatibility shim layer to use in said step (d) of block by block encrypting.

8. The method of claim 1, where said compatibility shim layer further verifies the integrity of said corresponding encrypted block $C_i$ by checking said corresponding authentication tag $T_i$, before block by block decrypting said corresponding encrypted block $C_i$ with said file key FK to produce corresponding said block $M_i$ of said plaintext file $F_p$.

9. A computer system operating under a semi-trusted user threat model that supports an authenticable user $U_x$ with an untrusted client device, said computer system comprising:
   (a) a file system having storage resources;
   (b) a plaintext file $F_p$ containing blocks $M_i$ of plaintext data, said plaintext file $F_p$ assigned a symmetric file key FK and a symmetric wrapping key WK;
   (c) a compatibility shim layer inserted on top of an Application Programming Interface (API) accessing said file system for block by block encryption of said blocks $M_i$ with said file key FK to produce corresponding authentication tags $T_i$, and corresponding encrypted blocks $C_i$ of an encrypted ciphertext file $F_c$;
   (d) a policy engine for performing an authentication of said authenticable user $U_x$ accessing said file system via a file system request generated on said untrusted client device, said policy engine further encrypting said file key FK by a symmetric wrapping key WK to obtain a wrapped file key WFK;
   (e) metadata related to said encrypted ciphertext file $F_c$ comprising said authentication tags $T_i$, said wrapped file key WFK, a key ID of said wrapping key WK and an Access Control List (ACL) related to said encrypted ciphertext file $F_c$, said metadata further protected from tampering by including in it a message authentication code (MAC) for a later verification of the integrity of said metadata; and
   (f) a key manager for storing said wrapping key WK.

10. The system of claim 9, wherein in response to said file system request and after performing said authentication, said policy engine further performs an authorization of said user $U_x$ based on said Access Control List (ACL) read from said metadata.

11. The system of claim 10, wherein said policy engine further reads said key ID from said metadata and queries said key manager for said wrapping key WK, then decrypts said wrapped file key WFK with said wrapping key WK to obtain said file key FK, and then releases said file key FK to said compatibility shim layer.

12. The system of claim 9, wherein said metadata further comprises the last time that a key rotation of said file key FK was performed.

13. The system of claim 9, wherein said policy engine further deploys a policy comprising:
   (g) a configuration information establishing sections of said file system that are to be encrypted;

(h) a configuration information selected from the group consisting of establishing each file in said file system to be uniquely assigned said wrapping key WK, establishing multiple files in a directory of said file system to be assigned said wrapping key WK and establishing multiple files in multiple levels of a directory tree of said file system to be assigned said wrapping key WK; and (i) a configuration information establishing the key rotation period for said sections of said file system that are to be encrypted.

14. A distributed computer system cluster operating under a semi-trusted user threat model that supports an authenticable user $U_x$ with an untrusted client device, said distributed computer system cluster comprising:

(a) a distributed file system having storage resources distributed over one or more datanodes of said cluster;

(b) a plaintext file $F_p$ having blocks $M_i$ of plaintext data, said plaintext file $F_p$ secured in said distributed file system as a ciphertext file $F_c$ having cyphertext blocks $C_i$ corresponding to said blocks $M_i$;

(c) a symmetric file key FK and a symmetric wrapping key WK assigned to said plaintext file $F_p$ and said ciphertext file $F_c$;

(d) a compatibility shim layer inserted on top of an Application Programming Interface (API) accessing said storage resources;

(e) an individual policy engine running on one or more of said datanodes for performing an authentication of said authenticable user $U_x$ accessing said file system via a file system request generated on said untrusted client device;

(f) a metadata related to said plaintext file $F_p$ and said ciphertext file $F_c$, said metadata comprising authentication tags $T_i$ and ciphertext blocks $C_i$ produced by block by block encryption by said compatibility shim layer of corresponding said blocks $M_i$, a wrapped file key WFK and a key ID of said wrapping key WK; and (g) a key manager for storing said wrapping key WK.

15. The distributed computer system cluster of claim 14 further comprising a master policy engine running on a namenode of said cluster, said master policy engine communicating a policy to said individual policy engine running on said one or more of said datanodes, said master policy engine further protecting said policy from tampering by utilizing a private key to cryptographically sign said policy.

16. The distributed computer system cluster of claim 14, wherein said individual policy engine receives from said key manager said wrapping key in response to sending it said key ID, then decrypts said wrapped file key WFK by said wrapping key WK to obtain said file key FK, and then transmits said file key FK to said compatibility shim layer.

17. The distributed computer system cluster of claim 16, wherein said compatibility shim layer first verifies the integrity of each of said encrypted blocks $C_i$ by checking its authentication tag, before decrypting it with said file key FK to produce a corresponding block of said blocks $M_i$ of said plaintext file $F_p$.

* * * * *